United States Patent [19]

Kojima

[11] 4,298,206
[45] Nov. 3, 1981

[54] FLEXIBLE PACKING FOR SEALING PIPELINE JOINTS

[76] Inventor: Noriatsu Kojima, 31, Yanagishima-cho 5-chome, Nakagawa-ku Nagoya-shi, Japan

[21] Appl. No.: 569,699

[22] Filed: Apr. 21, 1975

[30] Foreign Application Priority Data

Apr. 21, 1974 [JP] Japan ................................ 49-044674

[51] Int. Cl.³ .............................................. F16J 15/14
[52] U.S. Cl. .................................. 277/205; 277/211; 277/DIG. 2
[58] Field of Search ................. 277/DIG. 2, 205, 211, 277/207 A

[56] References Cited

U.S. PATENT DOCUMENTS

| | | | |
|---|---|---|---|
| 2,116,705 | 5/1938 | Marx et al. | 277/DIG. 2 |
| 2,529,098 | 11/1950 | Noll | 277/DIG. 2 |
| 3,020,054 | 2/1962 | Driancourt | 277/207 A |
| 3,107,922 | 10/1963 | Nathan | 277/168 |
| 3,204,971 | 9/1965 | Meriano | 277/211 |
| 3,315,970 | 4/1967 | Holloway | 277/207 A |
| 3,448,986 | 6/1969 | Jelinek et al. | 277/211 |
| 3,836,183 | 9/1974 | Battle | 277/211 |

FOREIGN PATENT DOCUMENTS 1921956 11/1970 Fed. Rep. of Germany .. 277/DIG. 2
1939779 9/1970 Fed. Rep. of Germany .. 277/DIG. 2

Primary Examiner—Lenard A. Footland
Attorney, Agent, or Firm—Irvin A. Lavine

[57] ABSTRACT

An improved packing member for sealing a joint in a pipeline, comprising a substantially cylindrical inner peripheral portion adapted to closely contact the outer surface of one pipe to be connected with another pipe in a pipe joint member, a substantially cylindrical outer peripheral portion adapted to closely contact the inner surface of the pipe joint member and a generally annular intermediate portion connecting the inner and outer peripheral portions integrally with each other. The intermediate portion is somewhat inwardly inclined from the outer peripheral portion toward the inner peripheral portion to define an outwardly diverging clearance between the packing member and the one pipe which communicates with an annular clearance defined between the pipe joint member and the one pipe at one end of the pipe joint member. A substantial free space is provided within the pipe joint member inwardly of the packing member and encircling the inner end of the one pipe to permit longitudinal displacement of the pipe and angular displacement thereof relative to the other pipe by cooperating with the outwardly diverging clearance of the packing member and the end clearance of the pipe joint member. The packing member is generally made of highly flexible and elastic material.

28 Claims, 88 Drawing Figures

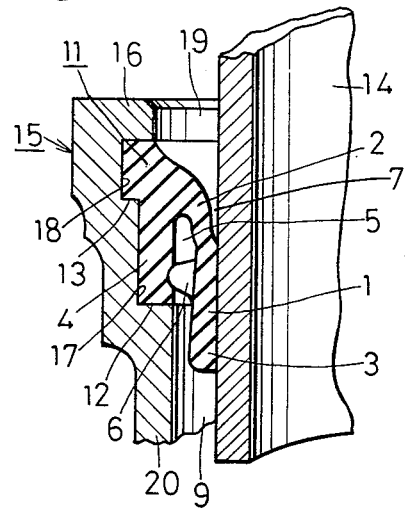
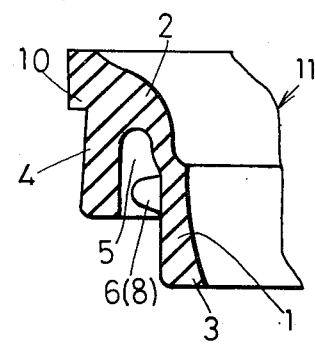
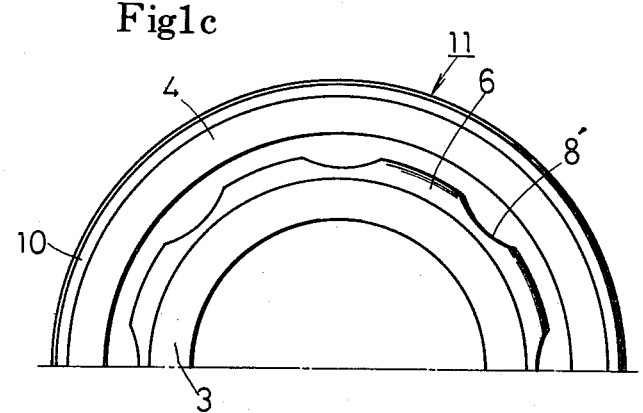
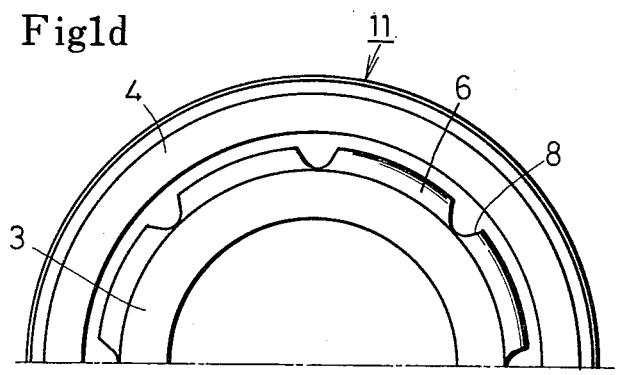

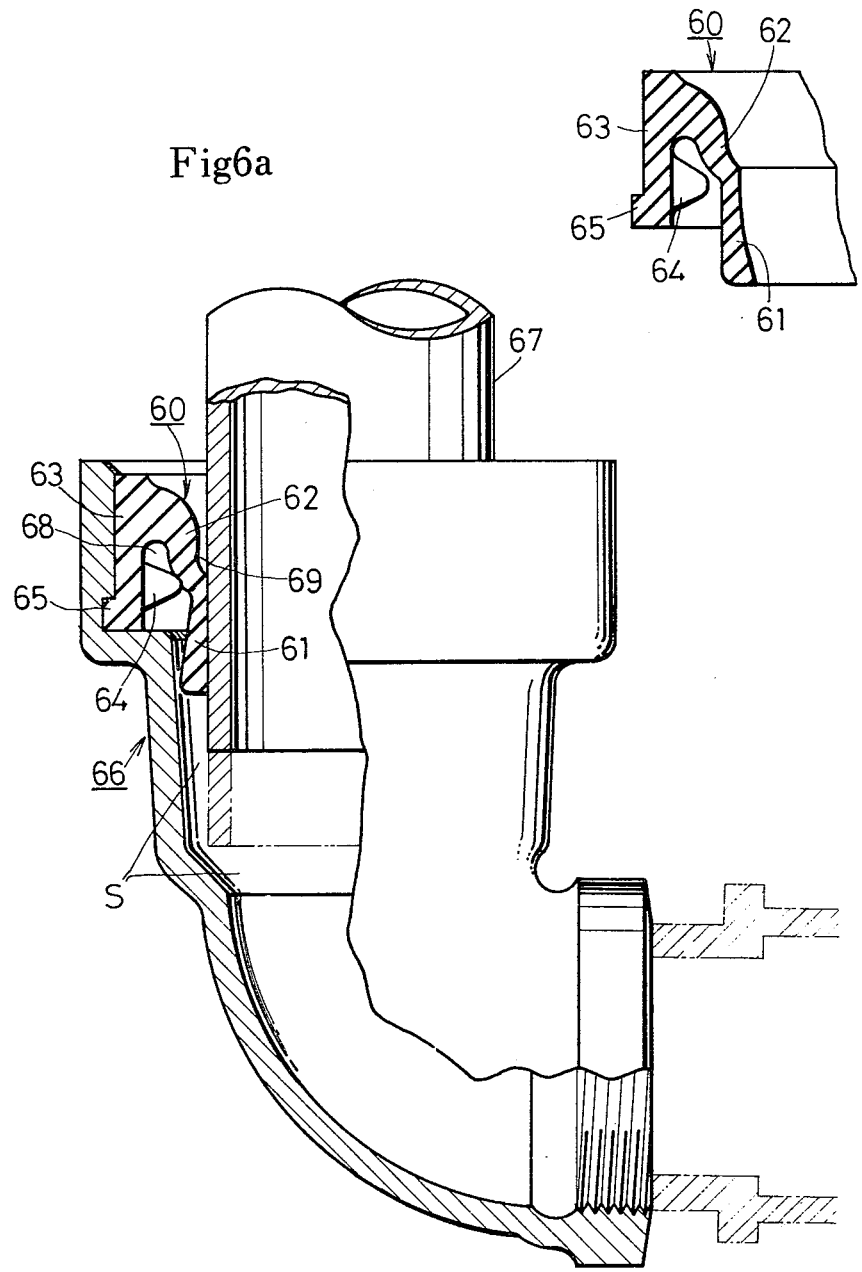

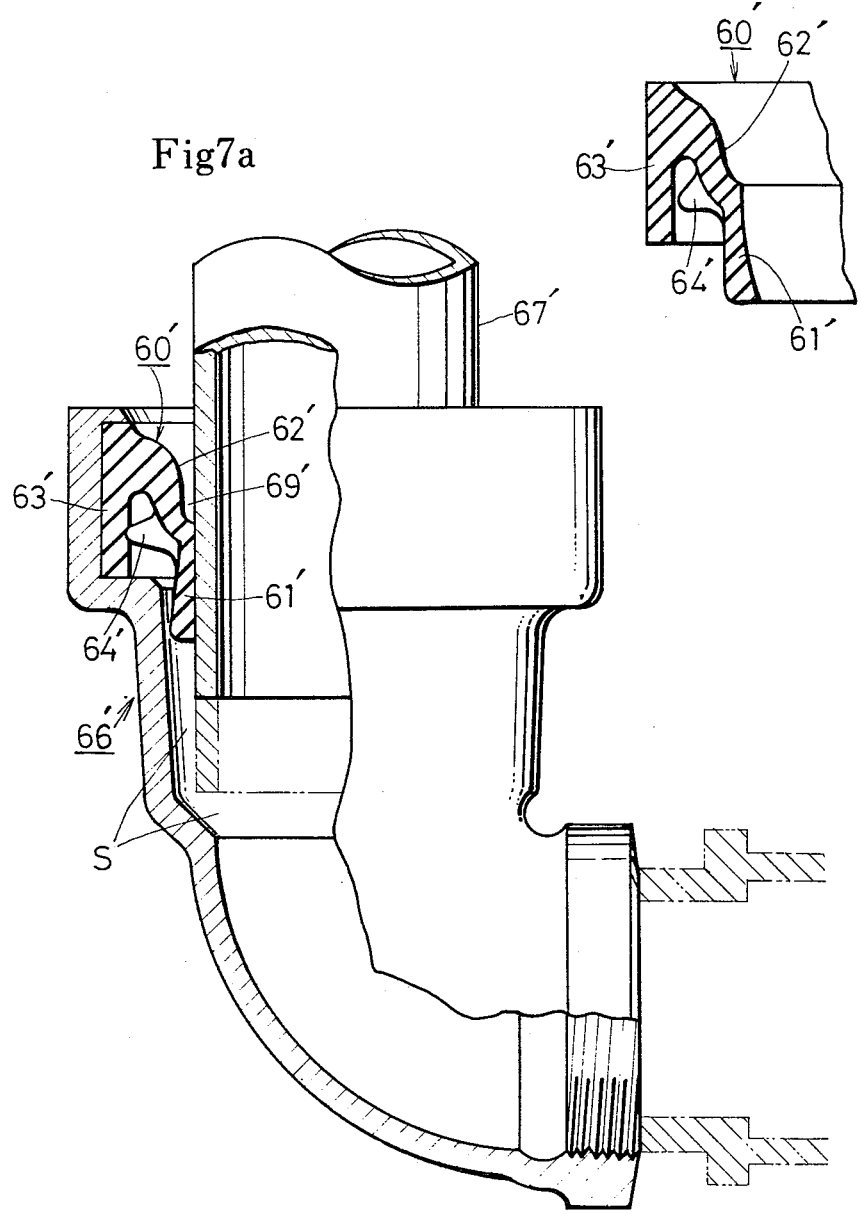

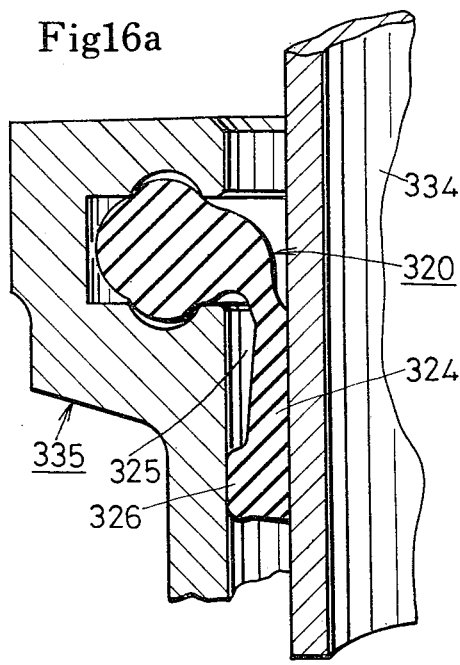
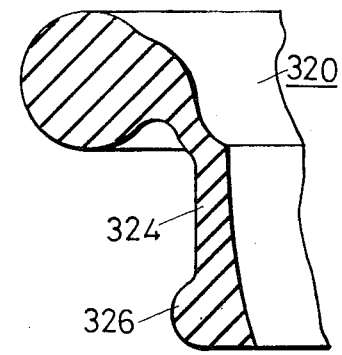
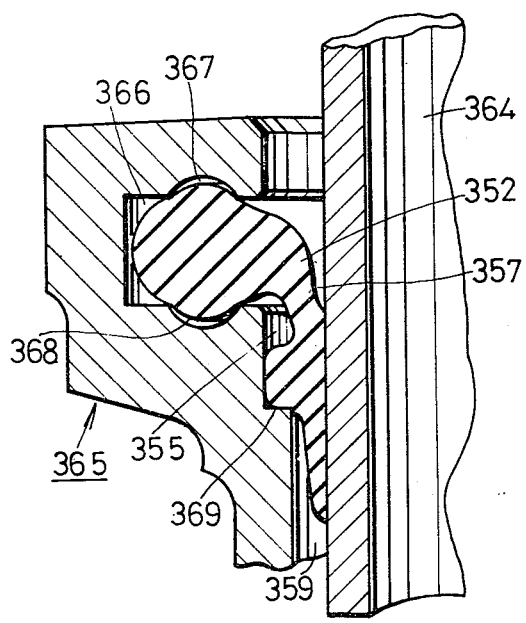
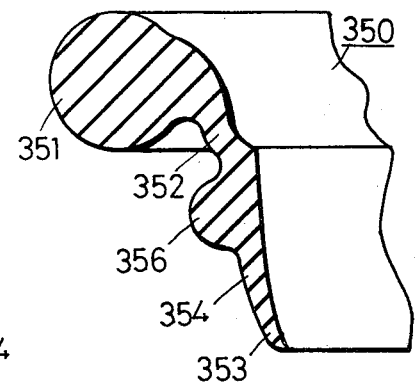
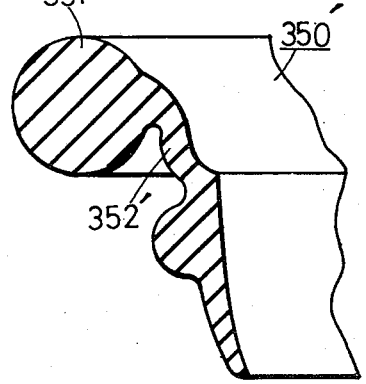

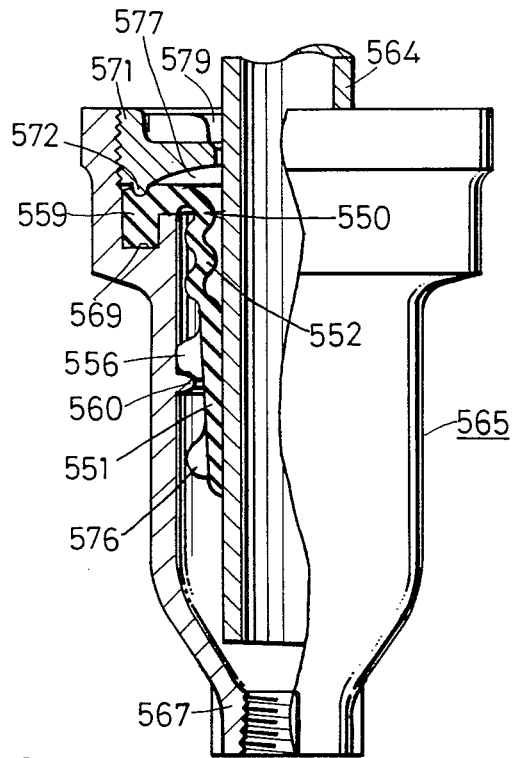
Fig28a
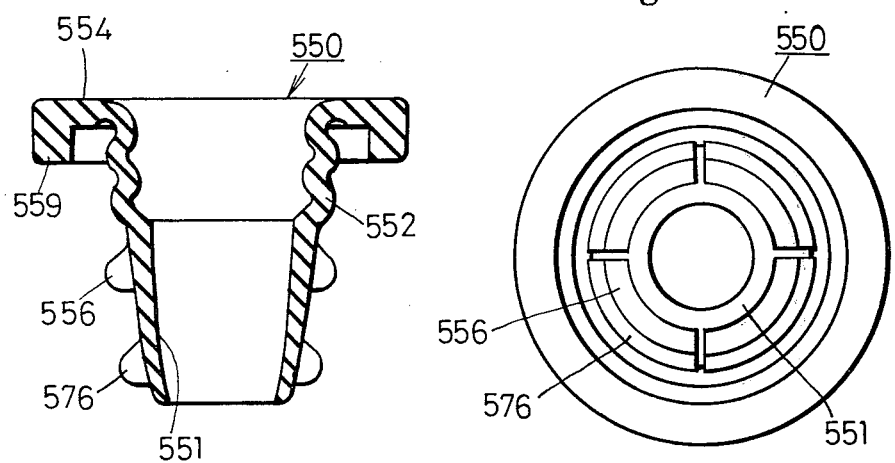
Fig28b
Fig28c

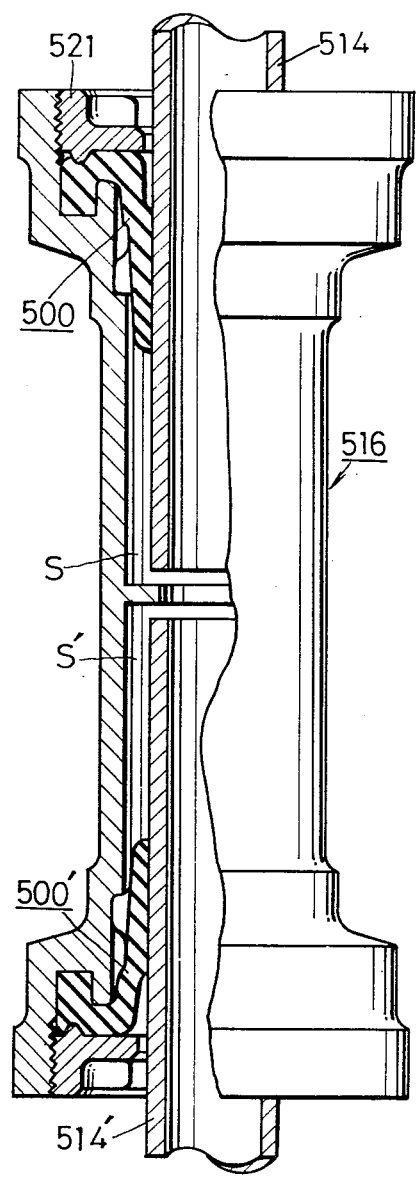

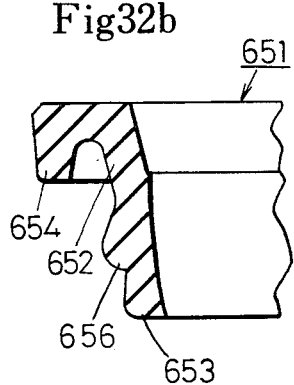
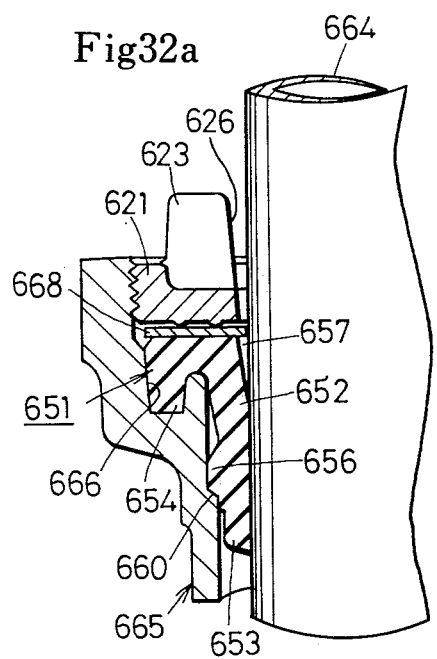
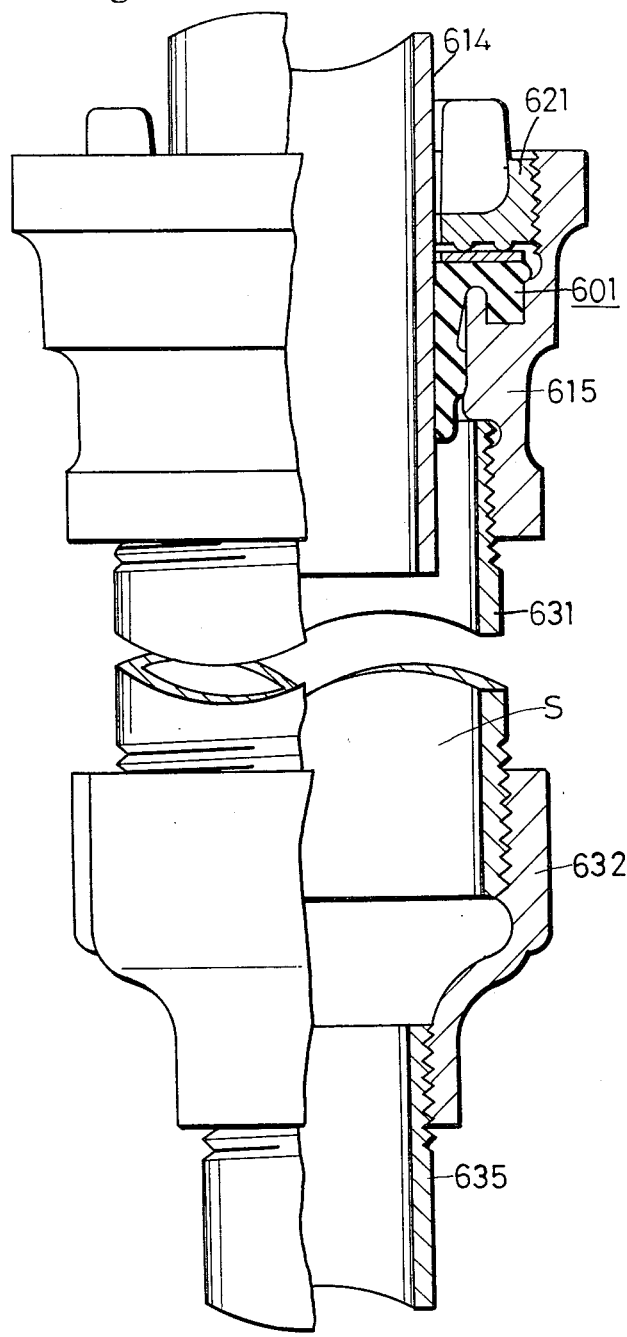

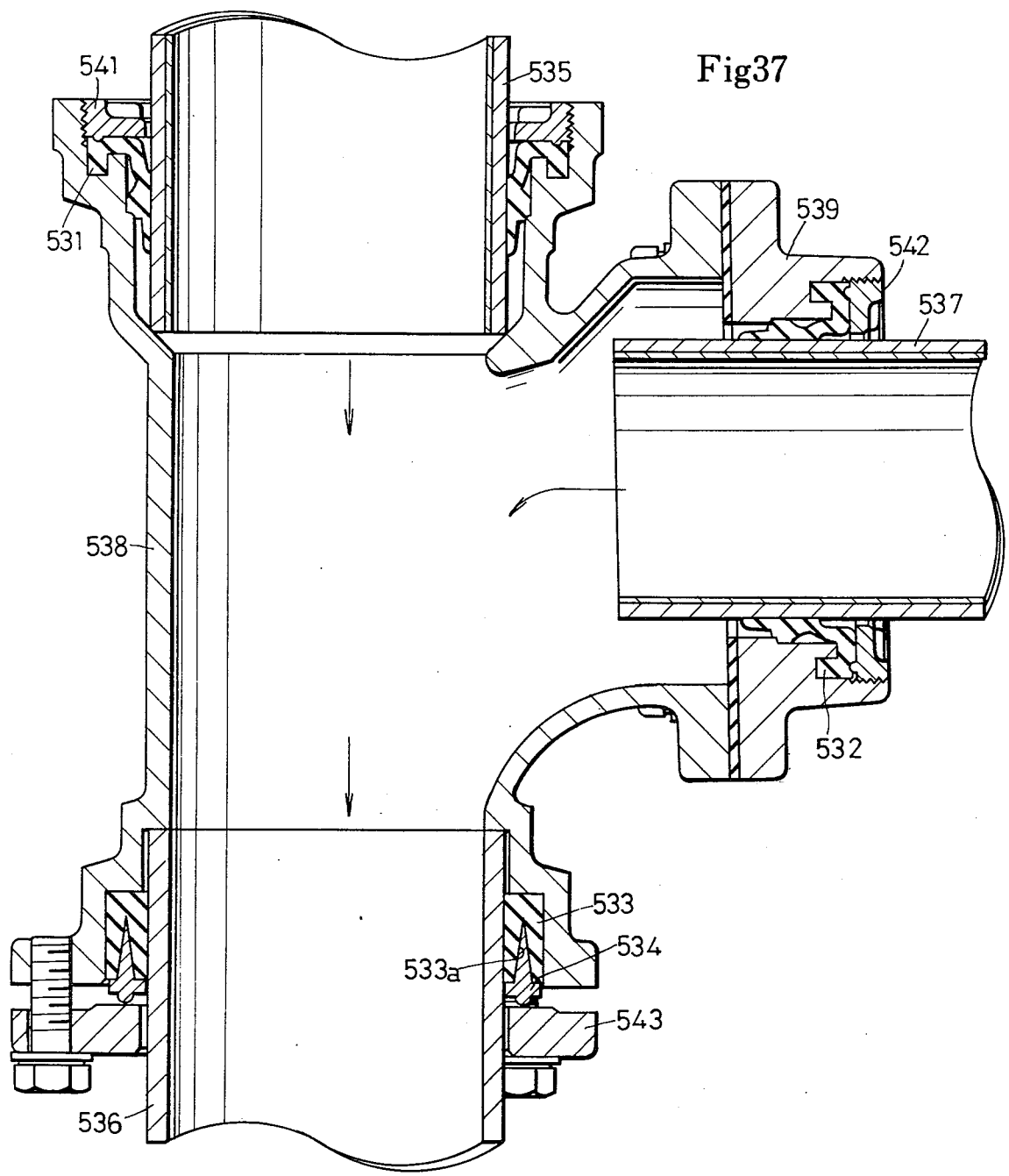

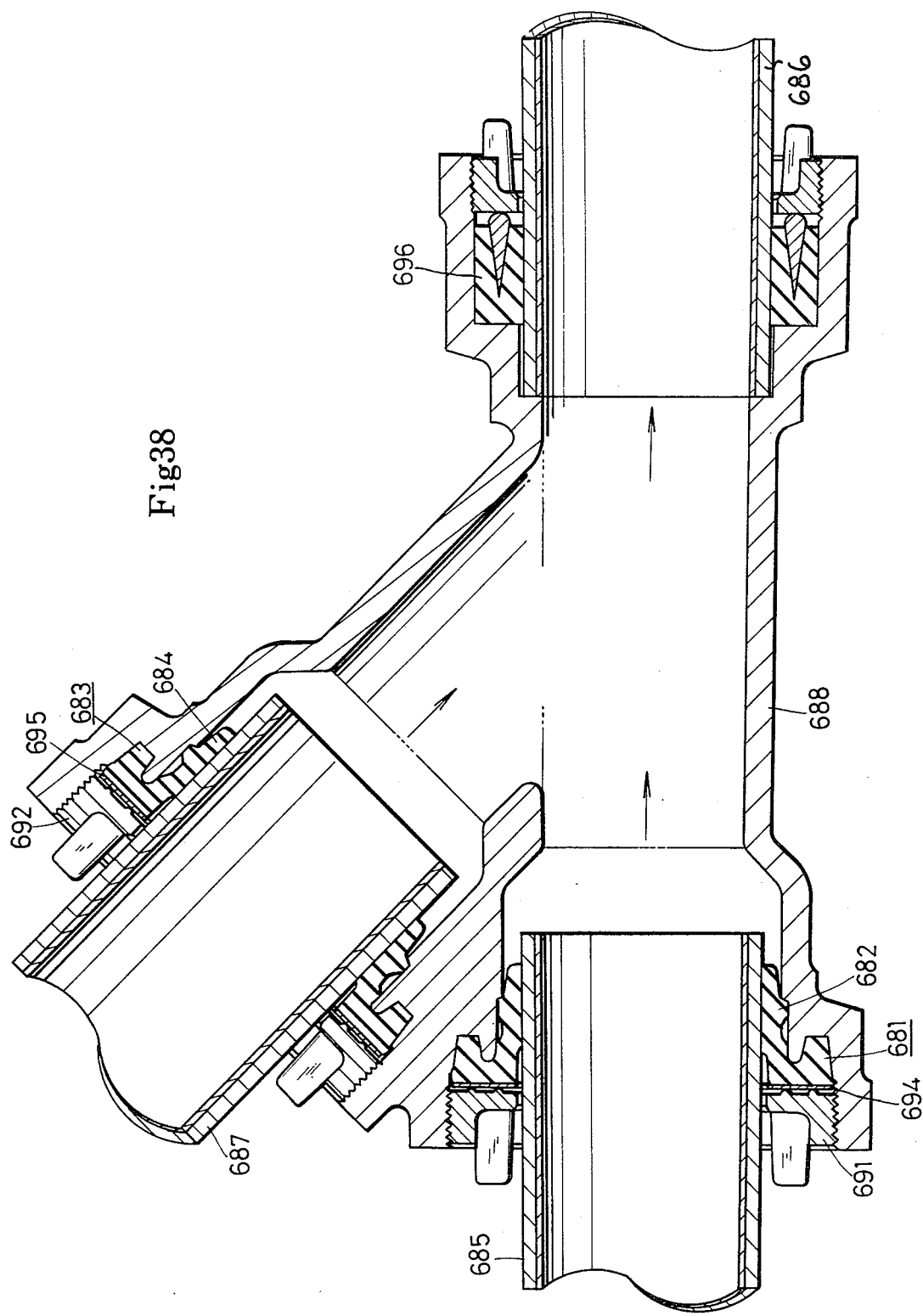

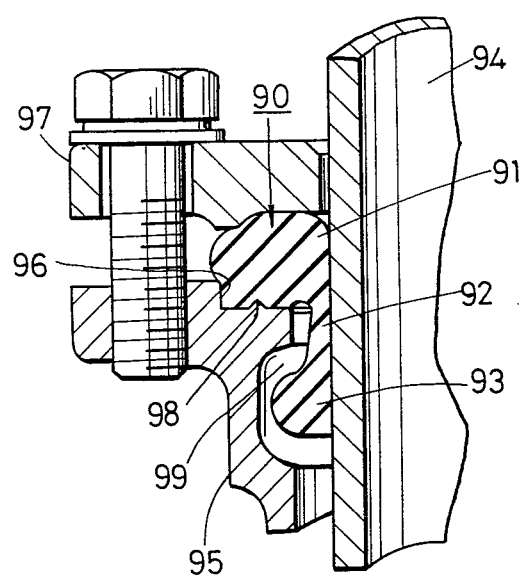
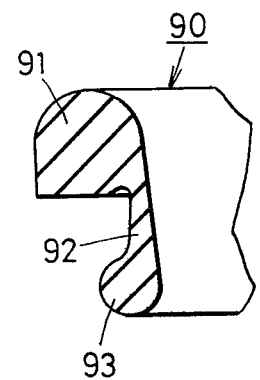
Fig42a
Fig42b

FLEXIBLE PACKING FOR SEALING PIPELINE JOINTS

This invention generally relates to packing adapted to close or seal a joint in a pipeline to prevent leakage of any fluid flowing therethrough. More particularly, this invention relates to flexible packing suitable for closing a pipeline joint in such a manner as to allow for a certain degree of positional difference or change in one pipeline member relative to another during pipeline installation or thereafter.

In the installation of a relatively large pipeline for a building or under the ground, it is nowadays often the practice to start work simultaneously at several different points of the pipeline or utilize a number of prefabricated piping units each comprising several different kinds of pipeline sections extending vertically or horizontally in a mutually parallel relation and secured to a common panel or frame, in order to complete the installation work quickly and efficiently. When several pipeline sections are installed in this way, it is usually the case that deviations or variations develop between each of several pairs of pipeline sections and must be absorbed during the connection of each pair of pipeline sections. These deviations or variations include variations in the distance between the pipe ends to be connected, axial deviation between the two pipeline sections to be connected or the axis of one pipeline section extending at an angle to that of the other section, or a combination of two or more of such variations or deviations which is often the case.

Similar variations or deviations do also occur to existing pipelines, in which stresses or strains are produced by the varying fluid pressure causing repeated movement, expansion and contraction of any pipeline portion or by some external loads, such as subsidence of the ground or building, an earthquake and weight of vehicles running on the road under which the pipeline extends. Those stresses or strains tend to forcibly deform or damage the pipeline at the joints therein.

It is, therefore, necessary, whether in a newly built pipeline or in an existing line, to provide a reasonable amount of allowance in a selected number of joints (including multi-way joints) to enable them to compensate for structural variations or deviations during the installation or operation of the pipeline in order to properly install it or maintain it in a satisfactory fluid-tight operating condition.

There have, however, been virtually no rigid and easily useable pipe joints suitable for connecting a pipeline in such a fashion as to satsify the foregoing requirements without relying upon flexible tubes of stainless steel, rubber or plastics or rubber joints. Even if there may have been joints which satisfy such requirements, there has existed virtually no packing that is capable of compensating for the above mentioned variations or deviations and preventing fluid leakage completely.

It is an object of this invention to provide flexible packing adapted to seal a pipe joint which is particularly suitable for connecting pipeline sections easily and reliably by absorbing any longitudinal, axial or angular variations or deviations which may exist between the pipe ends to be connected.

It is a second object of this invention to provide flexible packing adapted to maintain such a pipe joint in a fluid-tight condition over a long period of time by compensating for any such variations or deviations that may develop between the pipeline sections connected by such a pipe joint during the use of the pipeline.

It is a third object of this invention to provide flexible packing adapted to effectively seal such a pipe joint and prevent any fluid leakage therefrom over a long period of time by quickly responding to any such positional variations or deviations between the pipeline sections and adapting itself thereto due to its high flexibility and elasticity.

It is a fourth object of this invention to provide flexible packing which is very simple in construction, may be made of any suitable material depending on the nature of the fluid to be handled and the pipeline operating conditions and is durable over a long period of time.

It is a fifth object of this invention to provide a pipe joint particularly suitable for use in combination with the flexible packing of this invention, in which due to its novel shape and excellent elasticity and flexibility, the packing may be effectively held against both the pipe joint and the pipe ends connected thereby to close the joint perfectly, while the pipe joint is capable of adapting itself to any such variations or deviations that exist at the time of installation of a pipeline or may develop thereafter.

It is a sixth object of this invention to provide a packing gland or holder particularly suitable for use in combination with a pipe joint and flexible packing therefor according to the foregoing objects of this invention, and which is constructed to restrict, to the extent necessary for maintaining the packing in a satisfactorily operating condition, any positional variations or deviations that may develop in one pipeline section relative to another and any resultant deformation of the packing.

These objects may be generally attained by appropriately selecting according to this invention the shape, material and application of flexible packing to suit the nature and pressure of fluid flowing in a particular pipeline and the type of a pipe joint to be used in combination with the packing. Some specific structures embodying this invention will become apparent from the accompanying drawings and the detailed description thereof which will hereinafter appear.

This invention essentially provides a generally cylindrical piece of flexible packing adapted to seal a pipe joint connecting a pair of pipeline sections, and generally comprising an outer peripheral portion adapted to be held against the inner surface of one end portion of the pipe joint in which one of the pipeline sections is movably received, an inner wall portion adapted to be held against the outer surface of the one pipeline section and a substantially funnel-shaped, inwardly tapered intermediate portion extending between the outer peripheral and inner wall portions. The inner, outer and intermediate portions of the packing are of the unitary construction. The other pipeline section may be threadedly secured to the other end of the pipe joint, or may also be movably received in the other end of the pipe joint by means of another piece of flexible packing. The two pipeline sections may thus be joined in a fluid-tight fashion without contacting each other, and the flexible packing and the pipe joint according to this invention enable the two pipeline sections to be effectively joined due to their ability to adapt themselves to any usually existing axial, angular or other positional deviations between the two pipeline sections without causing any fluid leakage or deformation or damage to the pipeline.

These and other features and advantages of this invention will become apparent from the following detailed description and the accompanying drawings, in which:

FIG. 1a is a fragmentary longitudinal sectional view showing a first preferred embodiment of the flexible packing of this invention having a double walled, substantially cylindrical structure, in which the packing is sown in its installed position between a pipe and a pipe joint;

FIG. 1b is a fragmentary longitudinal sectional view of the packing of FIG. 1a, in which the packing is shown per se;

FIG. 1c is a fragmentary bottom plan view of the packing shown in FIG. 1b;

FIG. 1d is a fragmentary bottom plan view of a slightly modified form of the packing shown in FIG. 1c;

FIG. 2a is a fragmentary longitudinal sectional view showing in an installed position a modified form of the packing shown in FIG. 1a;

FIG. 2b is a view similar to FIG. 1b and showing the packing of FIG. 2a;

FIG. 3b is a view similar to FIG. 2b and showing the packing of FIG. 3a;

FIG. 6a is a front elevational view, partly in section, illustrating a modified double-walled packing structure used in combination with an elbow type pipe joint;

FIG. 6b is a fragmentary longitudinal sectional view of the packing shown in FIG. 6a;

FIG. 7a is a view similar to FIG. 6a and showing a slightly modified form of the packing shown therein, in combination with a slightly different elbow;

FIG. 7b is a fragmentary longitudinal sectional view of the packing shown in FIG. 7a;

FIG. 11 is a fragmentary longitudinal sectional view showing in combination with an O-ring a modified form of the packing shown in FIG. 9a;

FIG. 12b is a fragmentary longitudinal sectional view of the packing shown in FIG. 12a;

FIG. 13b is a fragmentary top plan view of FIG. 13a;

FIG. 14b is a fragmentary top plan view of FIG. 14a;

FIG. 15b is a fragmentary longitudinal sectional view of the packing shown in FIG. 15a;

FIGS. 16a and 17a are views similar to FIG. 15a and showing two modified forms, respectively, of the packing shown in FIG. 15a;

FIGS. 16b and 17b are views similar to FIG. 15b and showing the packing structures per se of FIGS. 16a and 17a, respectively, in their positions prior to installation;

FIG. 18 is a view similar to FIG. 17b and showing a slightly modified form of the packing shown therein;

FIG. 23a is a view similar to FIG. 22a, turned 180 degrees, and showing another basic form of the packing according to the third preferred embodiment of this invention, which is a slightly modified form of the packing shown in FIG. 22a;

FIG. 24b is a view similar to FIG. 23b and showing the packing of FIG. 24a;

FIG. 25b is a view similar to FIG. 24b, turned 180 degrees, showing the packing of FIG. 25a;

FIG. 26b is a view similar to FIG. 25b, turned 180 degrees, showing the packing of FIG. 26a;

FIG. 27b is a longitudinal sectional view of the packing shown in FIG. 27a;

FIG. 28a is a view similar to FIG. 27a and showing a modified form of the packing shown in FIG. 27a;

FIG. 28b is a view similar to FIG. 27b and showing the packing of FIG. 28a;

FIG. 27a and 28c are bottom plan views of the packing structures shown in FIGS. 27b and 28b, respectively;

FIG. 29 is a front elevational view, partly in section, of a pipe joint assembly having a pair of symmetrically disposed ends utilizing a pair of packing members shown in FIG. 27a each held in position by a threaded packing gland at one end of the assembly;

FIG. 32a is a fragmentary view similar to FIG. 31 and showing a slightly modified form of the packing shown therein;

FIG. 32b is a fragmentary longitudinal sectional view of the packing illustrated in FIG. 32a;

FIG. 33 is a partly omitted front elevational view, partly in section, of a large pipe joint assembly having an interconnecting pipe and utilizing the packing showing in FIG. 31;

FIG. 37 is a longitudinal sectional view of a three-way pipe joint including a slightly modified form of the packing shown in FIG. 29;

FIG. 38 is a view similar to FIG. 37 showing a modified form of the three-way joint shown therein, including packing members similar to that of FIG. 32a;

FIG. 42a is a view similar to FIG. 19 or 20a and showing a modified form of the packing according to the second preferred embodiment of this invention;

FIG. 42b is a view similar to FIG. 20b and showing the packing of FIG. 42a;

Figure 2A:
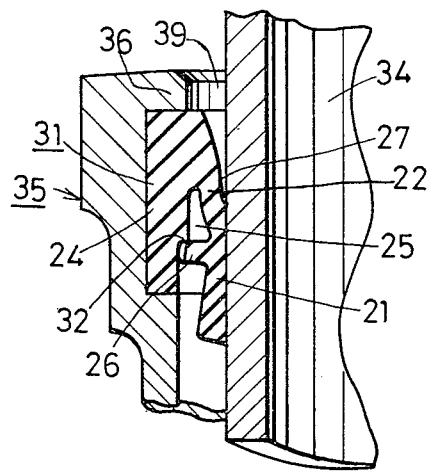

FIGS. 45a through 49a illustrate five different pipe joint assemblies each incorporating a modified combination of the packing members according to the first and second preferred embodiments of this invention; and FIGS. 45b through 49b are fragmentary longitudinal sectional views of the packing members shown in FIGS. 45a through 49a, respectively.

Detailed description will now be made of the preferred embodiments of this invention and several modifications or combinations thereof with reference to the drawings.

The flexible packing members of this invention may be roughly classified into the following three types mainly by their outer peripheral portions specifically adapted to sealingly engage with the associated pipe joint structures, though it is in many cases possible that clear-cut lines are difficult to draw between any two of these types and a variety of modifications or combinations of two or more types can exist within the spirit and scope of this invention:

A. A generally cylindrical packing structure of the double-walled construction having a pair of depending wall portions generally axially extending from an intermediate connecting portion;

B. A generally cylindrical, funnel-shaped packing structure having an outer rim portion shaped like (a) an O-ring or (b) a flange; and C. A generally cylindrical bifurcated packing structure having an O-ring shaped portion at the outer periphery thereof. The bifurcated wall portions diverge from the O-ring shaped end portion. Type C is a modified combination of type A and B(a).

Various forms of type A packing members are mainly illustrated in FIGS. 1a through 14b.

Referring particularly to FIGS. 1a–1d, a packing member is generally shown at 11 and is made of flexible material. The packing member 11 comprises a generally cylindrical inner peripherally extending wall 1, a generally cylindrical outer peripherally extending wall 4 extending substantially in parallel to the inner wall 1 and an inwardly tapered annular intermediate portion 2 connecting one end of the inner wall 1 with one end of the outer wall 4 to form a unitary structure. The outer wall 4 is smaller in length than the inner wall 1. The inner wall 1 is somewhat inwardly tapered toward its free end 3 and has a gradually increasing thickness. The annular portion 2 is shaped like an elephant's trunk in cross section as seen in FIG. 1a or 1b. Intermediate its ends, the inner wall 1 is formed around the outer surface thereof with an annular rib 6 having a substantially semi-circular cross section and directed toward the free end of the outer wall 4. The outermost peripheral edge of the annular rib 6 may be in the form of a true circle, or may alternatively include a plurality of generally semicircular recesses. One form of such recesses is shown at 8' in FIG. 1c and another form is shown at 8 in FIG. 1d. The recesses 8 in FIG. 1d are larger in depth, but smaller in width, than the recesses 8' shown in FIG. 1c. The inner wall 1, outer wall 4, portion 2 and annular rib 6 define therebetween an annular space 5 adapted by expanding or contracting to provide the packing 11 with the flexibility required to respond to variation in the pressure of fluid in an associated pipeline or absorb any external load applied thereto. The outer wall 4 includes an outwardly radially extending annular projection 10 adjacent to the portion 2. The packing 11 is associated with and sealingly engages a generally cylindrical pipe joint 15 to hold a pipe 14 in fluid-tight sealing connection as illustrated in FIG. 1a. The pipe joint 15 is formed at one end with an inwardly facing annular groove 18 which is complementary to the outwardly extending annular projection 10 of the outer wall 4.

Referring particularly to FIG. 1a, the pipe joint 15 has an opening 19 of larger diameter at one end than at the other end. The annular groove 18 defines a first shoulder 13 along its edge far from the opening 19. Inwardly of the shoulder 13, the pipe joint 15 includes a cylindrical inner surface 17 which is complementary to the outer surface of the packing outer wall 4. The cylindrical inner surface 17 defines a second annular shoulder 12 which extends inwardly to define a cylindrical portion 20 having an inner diameter which is somewhat larger than the outer diameter of the packing inner wall 1. The opening 19 is encircled by an annular flange 16 extending inwardly from an adjacent edge of the annular groove 18. The flange 16 serves to prevent the packing 11 from slipping away through the opening 19. The packing 11 is inserted through the opening 19 of the pipe joint 15 by utilizing its flexibility. Upon insertion in place, the packing 11 returns to its initial shape due to its elasticity and adapts itself closely to the inner peripheral configuration of the pipe joint 15 as shown in FIG. 1a. The free end of the outer wall 4 of the packing 11 rests closely against the second shoulder 12 of the pipe joint 15. The pipe 14, which is to be connected through the pipe joint 15 with another pipe not shown, is inserted through the packing 11 by expanding the inner wall 1 thereof to some extent until the inner end of the pipe 14 reaches a point within the cylindrical portion 20 beyond the free end 3 of the packing inner wall 1.

Figure 30:
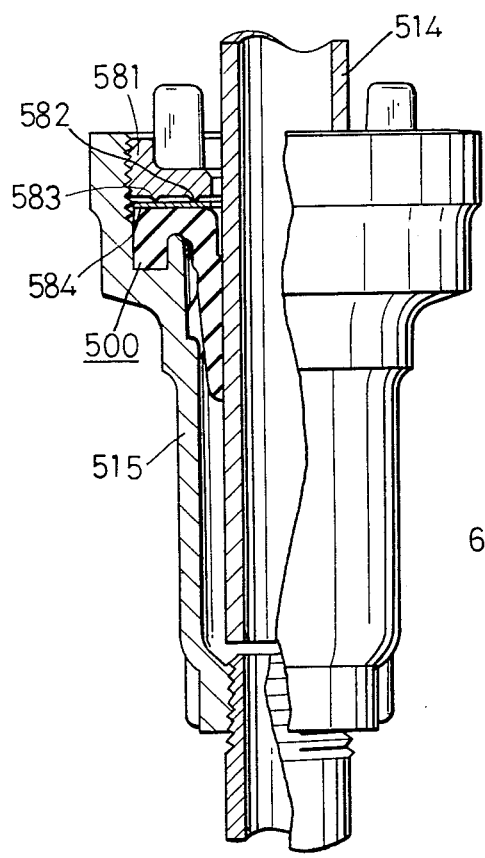
FIG. 30 is a view similar to FIG. 27a showing the packing held in position by a threaded packing gland with a washer therebetween.

The other end (not shown in FIG. 1a) of the pipe joint 15 beyond its intermediate cylindrical portion 20 is not limited to any particular shape or design, but may be shaped in a variety of fashions as shown by way of example in FIGS. 6a, 30 and 33, which will be referred to in detail as the description proceeds. It is, however, often useful and sufficient to connect another pipe directly to the other end of the pipe joint 15 by threaded connection or otherwise, or alternatively to utilize an intermediate connector of varying diameter and connect one end thereof to the other end of the pipe joint 15, while connecting the other end of the intermediate connector with the other pipe to be connected with the pipe 14 shown in FIG. 1a. As can be seen in FIG. 1a, an outwardly diverging clearance 7 is defined between the packing 11 and the pipe 14 and opens into the atmosphere through the opening 19. Another substantially cylindrical clearance 9 is defined between the pipe 14 and the pipe joint 15 inwardly of the packing 11 and communicates with the interior of the pipe 14, while it is effectively separated from the open air by the packing 11.

The packing 11 hereinabove described with reference to FIGS. 1a-1d have the following basic functions and advantages:

1. Effective sealing obtainable due to the flexibility and elasticity of the packing.

Upon positioning in place within the pipe joint 15, the packing 11 closely fits the inner surface of the pipe joint 15 mainly due to its elasticity and is adapted to effectively prevent any fluid leakage between the packing 11 and the pipe joint 15. As the pipe 14 is inserted through the packing 11, it bends the packing intermediate portion 2 radially because of the latter's flexibility and expands the inner wall 1. Due to its elasticity, the inner wall 1 closely fits the outer surface of the pipe 14 and is adapted to prevent any fluid leakage between the packing 11 and the pipe 14, whereby the packing 11 seals the pipe joint 15 completely against the pipe 14. As seen in FIG. 1a or 1b, the connecting intermediate portion 2 has a larger thickness at its base joining the outer wall 4 to not only improve durability, but also provide a reasonable amount of resistance to flexion or flexure. This resistance to flexion cooperates with the elasticity of the packing 11 and provides an effective sealing engagement against the pipe 14.

2. Additional sealing effect by the clamping force of the packing inner wall.

As shown in FIG. 1a or 1b, the inner wall 1 has its largest thickness at its free or inner end 3 except at the annular rib 6. The inner end 3 thus produces a strong clamping force against the pipe 14. The annular rib 6 also serves to produce a clamping force against the pipe 14. These clamping actions reinforce the sealing contact between the packing 11 and the pipe 14. Because of their largest mass, these thicker inner wall portions improve the resistance of the inner wall 1 to elastic fatigue.

3. Additional sealing effect by the bi-directional action of the annular rib.

Upon insertion of the pipe 14 through the packing 11, the annular rib 6 abuts against the inner surface of the outer wall 4 and forces the outer wall 4 closely against the inner surface of the pipe joint 15, including a reinforced sealing contact with the cylindrical inner surface 17. The reaction of this reinforced sealing contact forces the inner wall 1, via the annular rib 6, more closely against the pipe 14, so that effective sealing is obtained both around the inner and outer surfaces of the packing 11.

4. Effective sealing assisted by fluid pressure.

When the fluid in the associated pipeline has a relatively high pressure, a part of the fluid flowing into the cylindrical space 9 flows into the annular space 5 surrounded by the packing 11 and acts to expand the upper portion of the packing 11 to thereby enhance the sealing effect of the packing 11 against the pipe 14 and the pipe joint 15. This expansion is possible because of the presence of the clearance 7 between the packing 11 and the pipe 14. The end portion 2 formed in the shape of an elephant's trunk includes a less thick portion adjacent to the upper end of the inner wall 1. This less thick portion is free to deform itself with an increase in the pressure of the fluid in the annular space 5 and contacts the outer surface of the pipe 14, thereby forming an enlarged area of sealing contact with the pipe 14. Thus, an elevated fluid pressure does never cause any damage to the packing 11, but instead, increases its sealing contact with the pipe 14 and the pipe joint 15 to maintain the pipeline in a fluid-tight condition.

5. Buffer effect or compensation for sudden fluid pressure change.

The annular space 5 is substantially or completely closed by the annular rib 6. Due to the presence of the annular space 5 and also of the clearance 7 opening into the atmosphere, the packing 11 can quite effectively adapt itself to any sudden change in the pressure of the fluid in the pipeline and maintain the joint fluid-tight in the event of any such sudden pressure change.

6. Overall sealing effect.

The entire structure of the packing according to this invention is made of highly flexible and elastic material. The inner and outer wall portions and the connecting end portion of the unitary construction as a whole cooperate in accomplishing a very effective sealing purpose at any point around the packing under any operating condition of the associated pipeline. If the pressure of the fluid in the pipeline is very low, the packing produces a more than sufficient sealing effect by virtue of its elasticity alone. If the fluid pressure increases but is still relatively low, the packing is adaptably deformed to a somewhat increased extent due to its flexibility and increases its sealing contact with the associated surfaces to the extent required for compensating for the fluid pressure increase. As the fluid pressure further increases, a part of the fluid flows into the space enclosed by the packing and proportionally reinforces its sealing force against the associated pipe and pipe joint surfaces. It will be noted that the packing of this invention can achieve its sealing objective under any pipeline operating condition to the extent necessary and sufficient for maintaining the pipeline in a constantly effective fluid-tight condition. Moreover, because of the presence of a number of increased thickness portions thereon, the packing does not lose its elasticity and flexibility over a long period of time, but can be effectively used to maintain any pipeline joint in a fluid-tight condition semi-permanently.

7. Adaptability to positional variations or deviations between an associated pair of pipeline sections during pipeline installation and thereafter.

The present packing is designed to suit the associated pipe joint both structurally and functionally to adapt itself to any reasonable amount of longitudinal, axial, angular or other potential differences or deviations that may exist between a pair of pipeline sections to be connected at the time of pipeline installation, and any further positional changes that may develop from time to time thereafter. Due to its elasticity and flexibility, the packing can adapt itself uniformly as a whole to any external force thereon, instead of being subjected to any substantial localized deformation. The packing produces a uniform sealing effect all over the associated pipe and pipe joint surfaces. It is, thus, possible to avoid any localized application of load to the packing and effectively prevent any substantial localized fatigue in the packing material. Accordingly, the packing can maintain its excellent flexibility and elasticity for a long period of time and can long be placed in service without any appreciable lowering in its performance.

8. Function of the annular rib defining the annular space.

The annular rib may be provided in a variety of other shapes and positions to accomplish functions additional to those described in paragraph 3 above. Description of such additional functions will later be given after a variety of additional modified forms of the packing according to this invention are described.

It will be understood that while the most basic features of the packing according to this invention have been described, it may be varied or modified in its detailed structure in a variety of fashions to best suit the particular pipe joint structure with which the packing is to be associated, in order that any such pipe joint and packing combination may provide the best possible sealing performance for effective fluid-tight pipeline connection.

Figure 2B:
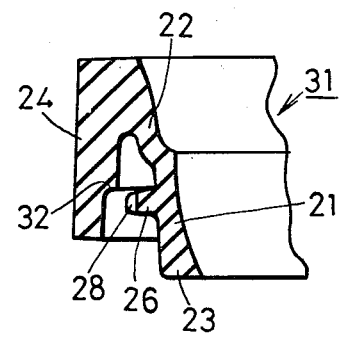
Figure 2C:
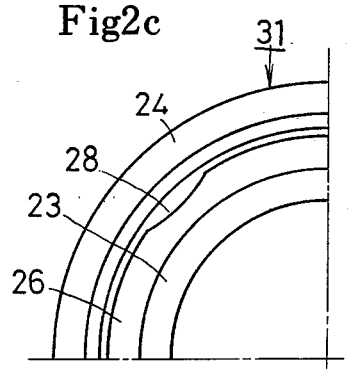
FIG. 2c is a fragmentary bottom plan view of the packing shown in FIG. 2b.

Referring now to FIGS. 2a through 2c, a packing member 31, which has a cross-sectional configuration somewhat differing from that of the packing 11 shown in FIG. 1b, is associated with and sealingly engages a pipe 34 and a pipe joint 35. The packing 31 includes a peripherally extending outer wall 24 having an entirely flat or straight outer circumferential surface which is complementary to and sealingly engages the associated inner cylindrical surface of the pipe joint 35 in a more simplified manner than shown in FIG. 1a. The outer wall 24, however, includes an outwardly directed (relative to the pipe 34 in FIG. 2a) annular shoulder 32 formed on the inner surface thereof intermediate the upper and lower ends thereof to define a reduced thickness free end portion. The packing 31 further comprises an inner peripheral wall 21 integrally joned to the outer wall 24 by an annular intermediate portion 22 formed in the shape of an elephant's trunk. The inner wall 21 includes an annular rib 26 formed intermediate the ends thereof and terminates in an increased thickness clamping end 23. The annular rib 26 is formed with an plurality of relatively shallow recesses 28 with equal spacing. The annular rib 26 is adapted to engage the shoulder 32 of the outer wall 24 upon insertion of the pipe 34 through the packing 31, and the shoulder 32 holds the annular rib 26 in position substantially perpendicular to the inner wall 21. Thus, the rib 26 is not liable to any appreciable flexure as fluid reaches it, but spans effectively between the inner and outer walls 21 and 24 to maintain a satisfactory fluid-tight pipeline connection. At one end, the pipe joint 35 includes an inwardly radially extending annular flange 36 which defines a circular opening 39 through which the packing 31 is inserted. The packing 31 is held against the inner surface of the flange 36 and does not unintentionally slip off the pipe joint 35. As installed in place, the packing 31 defines an inner annular space 25 surrounded by the connecting portion 22, the outer wall 24 and the annular rib 26. Because of its trunk-shaped sectional configurations, the connecting portion 22 defines therewithin an outwardly diverging clearance 27 encircling the pipe 34 and communicating with the opening 39 as illustrated in FIG. 2a.

Figure 3A:
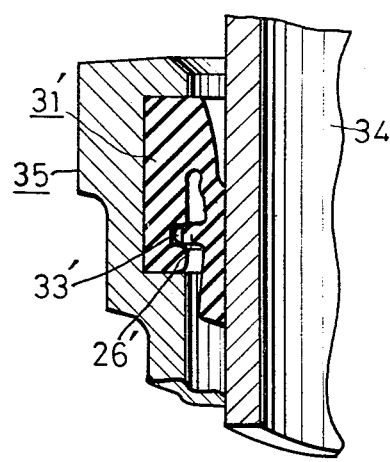
FIG. 3a is a view similar to FIG. 2a and showing a slightly modified form of the packing shown therein.
Figure 3B:
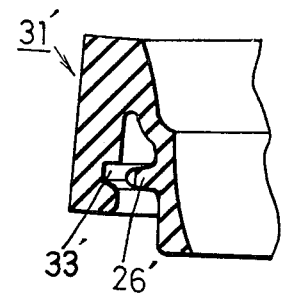
Figure 3C:
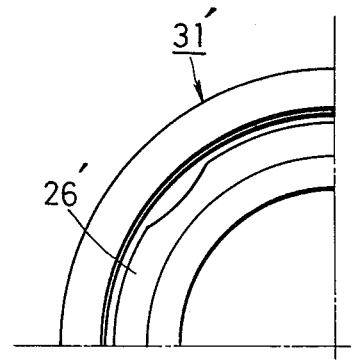
FIG. 3c is a fragmentary bottom plan view of the packing shown in FIG. 3b.

Referring to FIGS. 3a through 3c, a packing member 31' is a slightly modified type of the packing 31 shown in FIG. 2b. The annular shoulder 32 on the outer wall 24 is replaced by an annular groove 33' which is engageable with an associated annular rib 26' formed on the outer surface of the packing inner wall as shown in FIG. 3a. The other features of the structure shown in FIGS. 3a through 3c are identical to those shown in FIGS. 2a through 2c.

Figure 4:
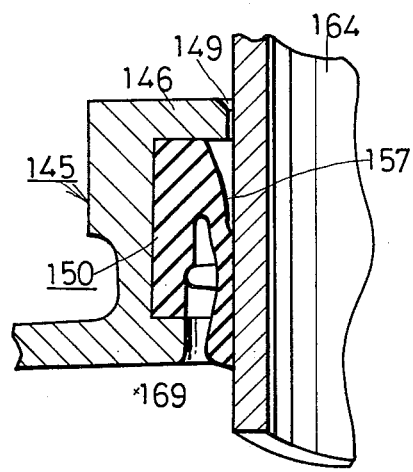
FIG. 4 is a fragmentary longitudinal sectional view of packing similar to that of FIG. 2b and shown as used in combination with a somewhat different type of pipe joint.
Figure 5:
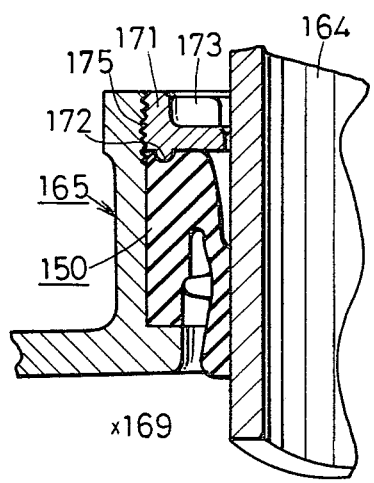
FIG. 5 is a fragmentary longitudinal sectional view showing a modified form of the packing shown in FIG. 4, in which the packing is illustrated with a cooperating packing gland.

Reference is now made to FIGS. 4 and 5 illustrating two somewhat modified types of pipe joints 145 and 165, respectively. Both the pipe joints 145 and 165 include an outwardly radially extending flange defining an enlarged inner space 169 into which one end of one pipe 164 is connected. Referring particularly to FIG. 4, the pipe joint 145 includes an inwardly radially extending annular flange 146 having a relatively large radial width which defines a central circular opening 149 of relatively small diameter through which the pipe 164 extends, so that a relatively small clearance encircles the pipe 164. A packing member 150, which is quite similar in construction to those described with reference to FIGS. 1a through 3c, is held in position against the inwardly extending flange 146 of the pipe joint 145 and defines an outwardly diverging clearance 157 encircling the pipe 164. The major advantages of the small diameter opening 149 are its capability to substantially prevent any dust, sand or other foreign material from entering the inner clearance 157, as well as its ability to restrict radial movement of the pipe 164 in order to protect the packing 150 against any excessive deformation. In the event the opening 149 proves too small to readily receive the pipe 164 therethrough, the pipe 164 may be inserted through the other end of the pipe joint 145. The pipe joint 165 shown in FIG. 5 provides a solution to any possible difficulty that may result from a relatively small pipe joint end opening in pipe insertion.

Referring particularly to FIG. 5, the pipe joint 165 comprises a cylindrical side wall having no inwardly extending flange or end wall of the type shown at 146 in FIG. 4. The inlet end of the cylindrical side wall of the pipe joint 165 is threaded along its inner circumferential surface as indicated at 175. A packing gland 171 is threadedly connected with the pipe joint 165 at 175 and includes a radially extending wall portion having a central circular opening through which the pipe 164 extends. The packing gland 171 thus defines a relatively small clearance encircling the pipe 164 as obtained by the flange 146 in FIG. 4. The radially extending wall portion of the packing gland 171 carries a plurality of tabs 173 for use in tightening the packing gland 171 into the pipe joint 165 or loosening it therefrom. The packing gland 171 further includes an axially extending annular rib 172 formed on its radially extending wall portion. The rib 172 is adapted to keep the remainder of the packing gland 171 spaced from the packing 150 substantially throughout the insertion of the packing gland 171 to thereby obviate the frictional resistance which may otherwise be imparted by the packing 165 onto the packing gland 171 during insertion of the latter, while serving to hold the packing 165 in position.

Attention is now directed to FIGS. 6b and 7b which show two slightly modified packing members 60 and 60', respectively, each having a differently positioned annular rib 64 or 64'. Referring particularly to FIG. 6b, the packing 60 comprises an inner wall 61, an outer wall 63 and an intermediate end portion 62 connecting the inner wall 61 and the outer wall 63 with each other at one end of the packing 60. The annular rib 64 is formed on the inner surface of the outer wall 63 and directed toward the inner wall 61. The annular rib 64 may or may not be provided with a plurality of recesses along the outer edge thereof. FIG. 6a illustrates a pipe joint assembly incorporating the packing 60 shown in FIG. 6b. At the other end of the packing 60, the outer wall 63 includes an outwardly radially extending annular flange 65, by which the packing 60 is held in a 90° elbow joint 66. A pipe 67 is held against the inner wall 61 and holds the intermediate connecting portion 62 against the annular rib 64 to thereby define an inner annular space 68 within the packing 60. An outwardly diverging clearance 69 is provided between the packing 60 and the pipe 67. The end of the elbow 66 within which the packing 60 is placed is cylindrical and has a large opening to facilitate insertion of the packing 60.

Referring to FIG. 7b, the packing 60' is a modified type of the packing 60 shown in FIG. 6b. The packing 60' comprises an inner wall 61', an outer wall 63' having a straight or flat outer peripheral surface and an intermediate connecting end portion 62'. The annular rib 64' is formed on the boundary area between the inner wall 61' and the intermediate connecting portion 62' and is directed toward the outer wall 63'. According to this invention, however, it does not make any substantial difference whether the annular rib is formed on the inner wall or the outer wall of the packing. FIG. 7a illustrates a pipe joint assembly utilizing the packing 60' of FIG. 7b. The assembly includes a 90° elbow joint 66' having at one end a radially inwardly extending end wall of relatively small radial width against which the packing 60' is held in place. The trunk-shaped intermediate connecting portion 62' defines therewithin an outwardly diverging clearance 69' encircling the pipe 67'. The inner end of the pipe 67' projects beyond the free inner end of the packing 60' into the interior of the elbow 66' to define an annular or cylindrical space S surrounding the inner end of the pipe 67'. The packing 60' is interposed between the elbow 66' and the pipe 67' without causing any contact therebetween. Due to its excellent elasticity and flexibility, the packing 60' is reasonably deformable to adapt itself to positional changes of the pipe 67' relative to the elbow 66' to maintain a fluid-tight joint. This adjustment is assisted by the presence of the inner space S and the outer clearance 69' around the pipe 67'. In FIGS. 6a and 7a, the phantom lines in the space S indicate axial inward displacement of the pipe 67 or 67'. Due to its flexibility, especially the flexibility of the intermediate connecting portion 62 or 62', the packing 60 or 60' can quickly adapt itself to any reasonable angular or axial difference or variation in the pipe 67 or 67' relative to the elbow 66 or 66' and maintain a satisfactory fluid-tight connection therebetween.

Reference is now made to the material of which the packing of this invention is made. The packing of this invention, which is always used between a rigid pipe and an also rigid pipe joint member, requires elasticity and flexibility and may be made of natural or synthetic rubber as a whole. In order to improve the strength of the packing or its resistance to fluid pressure, it is useful to add textile or glass fiber portions to the packing. Various types of synthetic rubber may be used depending on the type of fluid with which the packing is placed in contact. The following combination is not limitative, but illustrative only:

| Fluid | Synthetic Rubber |
| --- | --- |
| Water | Chloroprene rubber |
| Warm water or steam (high temp.) | Silicone rubber |
| Warm water or steam (low temp.) | Ethylenepropylene rubber |
| Town gas or oil | Nitrile rubber |
| Chemicals | Fluorine rubber |

Figure 8A:
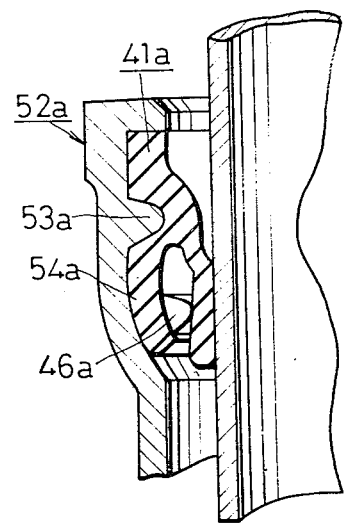
FIGS. 8a, 9a and 10a are fragmentary longitudinal sectional views showing in their respective installed positions in fragmentary longitudinal section three different double-walled type packing structures which are slight modifications to one another.
Figure 8B:
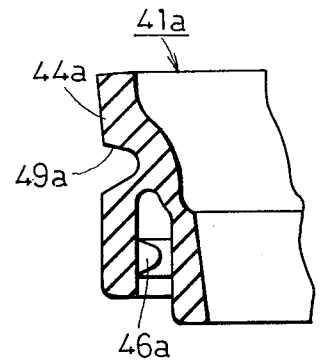
FIGS. 8b, 9b and 10b are fragmentary longitudinal sectional views of the packing structures shown in FIGS. 8a, 9a and 10a, respectively.
Figure 9A:
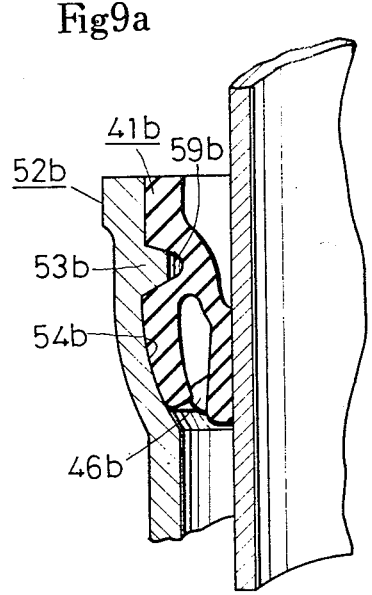
Figure 9B:
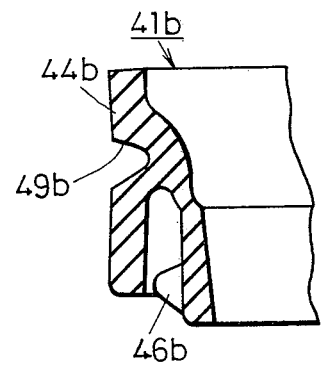
Figure 10A:
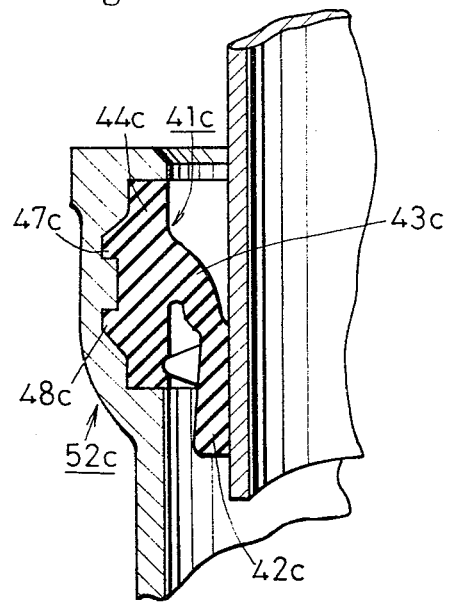

Referring to FIGS. 8a, 9a and 10a, there are shown modified double-walled packing members 41a, 41b and 41c having different outer wall shapes. The packing 41a shown in FIG. 8b includes an annular groove 49a on the outer surface of its outer wall 44a intermediate the ends thereof. The annular groove 49a is adapted to engage an annular rib 53a projecting inwardly from the inner surface of an associated pipe joint 52a. The packing 41b shown in FIG. 9b has a similar annular groove 49b in a similar position on its outer wall 44b. The annular groove 49b is adapted to engage an annular rib 53b projecting inwardly from the inner surface of an associated pipe joint 52b. The annular rib 53b is frustoconical in cross section, while the annular rib 53a in FIG. 8a is semi-circular. The annular grooves 49a and 49b shown in FIGS. 8b and 9b are both semi-circular in cross section. Thus, the annular rib 53b shown in FIG. 9a defines an annular vacant space 59b in the annular groove 49b of the packing 41b when it is engaged therewith. The vacant space 59b holds air and acts as a cushion for providing the packing 41b with uniform flexibility for effective sealing and adaptability to positional changes. The packing 41a further includes an annular rib 46a projecting inwardly from the inner surface of the outer wall 44a toward its inner wall, while the packing 41b shown in FIG. 9b includes an annular rib 46b projecting outwardly from the outer surface of its inner wall. The pipe joints 52a and 52b shown in FIGS. 8a and 9a, respectively, include inwardly curved inner surfaces 54a and 54b, respectively, beyond their respective annular ribs 53a and 53b. As shown in FIGS. 8a and 9a, the outer wall 44a (or 44b) of the packing 41a (or 41b) is bent in a manner complementary to the curved inner surface 54a (or 54b) and contacts it closely. This serves to maintain an effective fluid-tight connection, which is also enhanced by the groove and rib engagement between the packing and the pipe joint and the annular rib 46a (or 46b) spanning between the packing inner and outer walls. The annular groove 49a or 49b of the packing may have any other cross sectional shape, including square, triangular and trapezoidal. Also, it may be formed at an acuter angle relative to the outer wall surface than the annular rib of the pipe joint is relative to the inner surface of the latter, in order to provide a reinforced groove and rib sealing engagement.

Figure 10B:
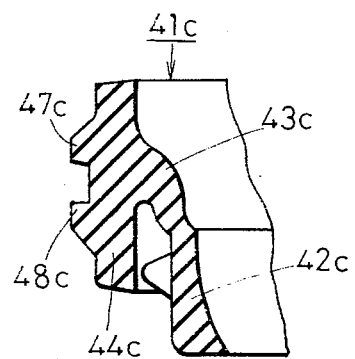
Figure 10C:
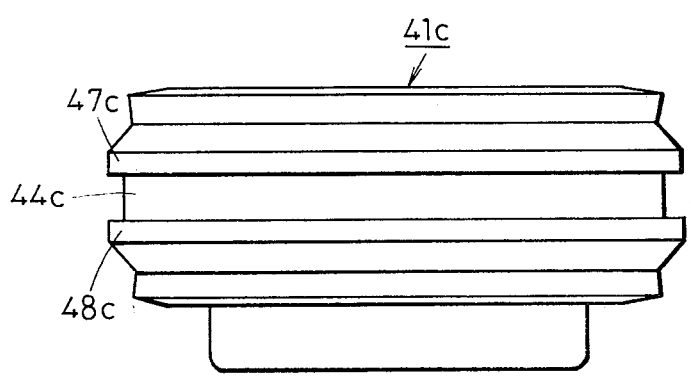
FIG. 10c is an entire front elevational view of the packing shown in FIG. 10b.

The packing 41c shown in FIGS. 10a through 10c includes a pair of symmetrically disposed annular ribs 47c and 48c coaxially encircling its outer wall 44c and axially spaced apart to define therebetween an annular groove encircling the outer wall 44c and having a rectangular cross section. An associated pipe joint 52c has an inner surface configuration complementary to the outer peripheral surface of the packing 41c and includes an inwardly projecting annular rib complementary to the annular groove in the packing 41c. The packing 41c further includes an inner wall 42c, an intermediate connecting portion 43c and an annular rib formed on the inner wall 42c which are all similar to those already described.

It will be understood that the outer peripheral surface configuration of the packing according to this invention may be appropriately modified to any other shape than hereinabove described. The packing of this invention is generally cylindrical as by way of example shown in front elevation in FIG. 10c. The packing is made of elastic and flexible material as a whole and its intermediate end portion connecting the inner and outer portions is preferably designed to have well-balanced flexibility.

In the situation where it is difficult to maintain a pipeline in a stably supported condition, for example, as is often the case with an underground pipeline, it is possible that the weight of the pipeline and any external load applied thereto may act to urge the packing toward one side to the extent exceeding the elasticity or resiliency of the packing, with a resulting failure of the packing to maintain the pipeline in a fluid-tight condition. In order to provide an effective solution to this problem, the inventor of this invention proposes use of a metallic ring or otherwise shape holding or clamping member with the packing of this invention. Several examples of this arrangement will now be described with reference to FIGS. 11 through 14b.

Figure 11:
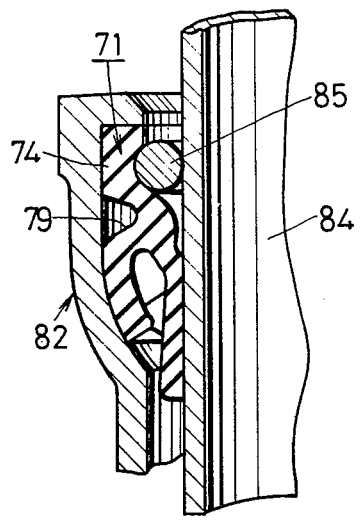

Referring particularly to FIG. 11, there is shown a packing member 71 which is substantially identical to the structure shown in FIG. 9b and is associated with a pipe joint 82 to hold a pipe 84 in position. The packing 71 includes an annular groove 79 formed on the outer surface of its outer wall 74. The pipe joint 82, however, has an entirely flat inner surface with no rib or projection engageable with the annular groove 79 of the packing 71. Thus, the entire annular groove 79 defines an annular vacant space for holding air to improve the flexible deformability of the packing inner and outer wall portions beyond the groove 79. On the opposite side of the annular groove 79 from the inner wall, a metallic O-ring 85 is closely fitted in the space between the inner surface of the outer wall 74 and the outer surface of the pipe 84 and securely supports the pipe 84 against the packing 71. The O-ring 85 serves to prevent excessive deformation of the packing 71 by any large external load imparted thereto, while holding the packing in place within the pipe joint 82.

Figure 12A:
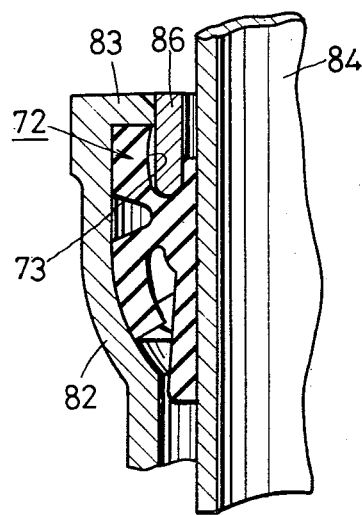
FIG. 12a is a view similar to FIG. 11 and showing a modified form of the packing shown therein, in which the packing is held in position by a cylindrical holder.
Figure 12B:
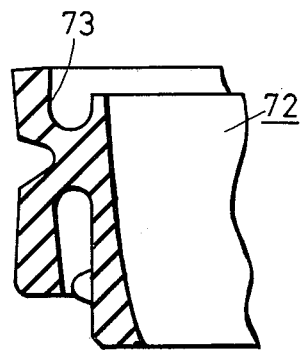

Referring to FIGS. 12a and 12b, there is shown a generally similar packing member 72 located within a pipe joint 82 having a radially inwardly extending annular end wall 83 which defines a central circular end opening through which a pipe 84 extends. The packing 72 includes an axially formed annular groove 73 which communicates with the end opening of the pipe joint 82. Adjacent to the groove 73, the inner surface of the packing outer wall is substantially flush with the inner peripheral surface of the pipe joint end wall 83 as illustrated in FIG. 12a. A metallic cylindrical holding member 86 has one end closely fitting the annular groove 73 and an outer peripheral surface which is placed substantially in close contact with the inner peripheral surfaces of the pipe joint end wall 83 and of the packing outer wall. The holding member 86 prevents the pipe 84 from imparting any excessive load onto the packing 72.

Figure 13B:
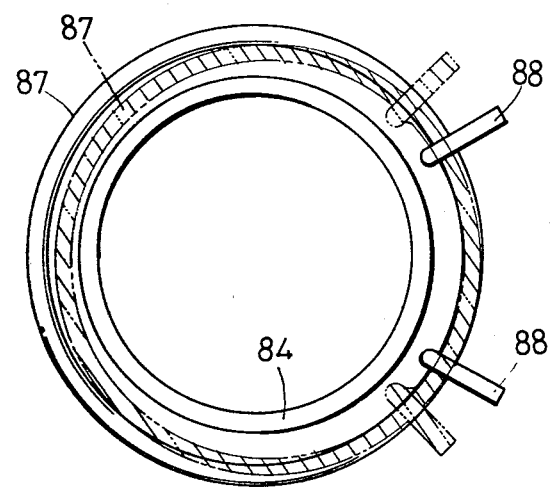
Figure 13A:
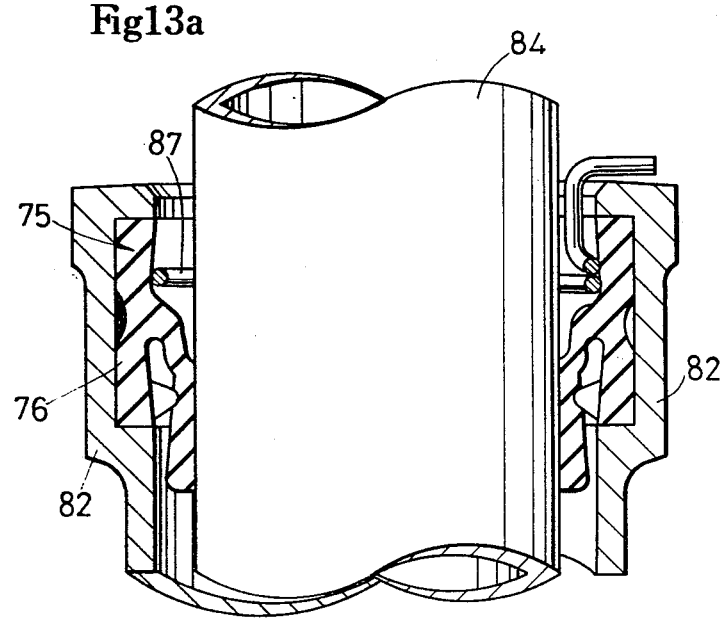
FIG. 13a is a longitudinal sectional view illustrating a modified form of the packing shown in FIG. 11, the packing being held in position by a clamping coil.
Figure 14B:
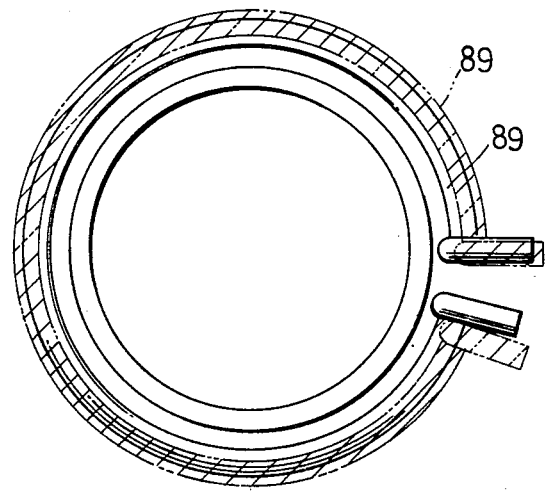
Figure 14A:
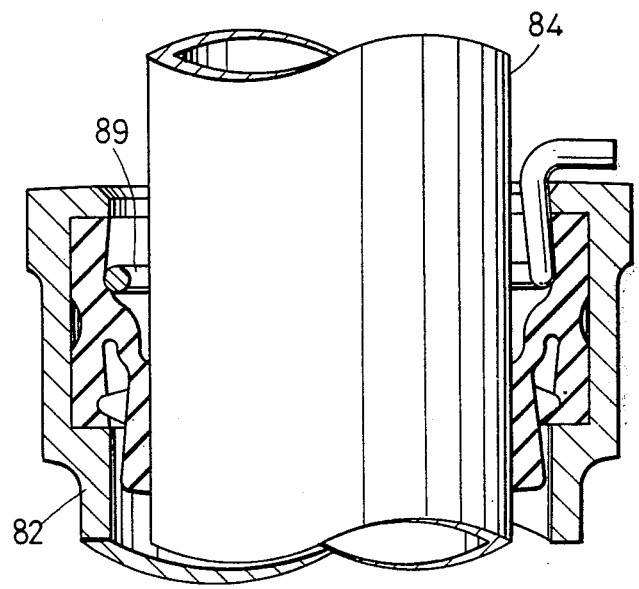
FIG. 14a is a view similar to FIG. 13a and showing a slightly modified form of the packing shown therein, the packing being held in position by a different type of clamping coil.

FIGS. 13a and 13b shows a packing member 75 which itself is substantially similar in structure to that of FIG. 11 and includes an outer wall 76 contacting the inner surface of an associated pipe joint 82. The packing 75 also includes an inner wall supporting a pipe 84 thereon in a fluid-tight fashion. The arrangement of FIG. 13a includes a clamping coil 87 made of resilient metal wire and held against the inner surface of the outer wall 76 adjacent to the intermediate connecting portion of the packing 75. The free ends of the clamping coil 87 overlap each other to some extent as illustrated in FIG. 13b and extend outwardly to define a pair of handles 88. The handles 88 may be moved away from each other to reduce the diameter of the clamping coil 87 for its insertion through the packing 75. The clamping coil 87 holds the packing 75 in place against the inner surface of the pipe joint 82 to maintain a fluid-tight contact therebetween, while at the same time, serving to prevent any excessive deformation of the packing 75 in the event it is subjected to any excessive localized load. FIGS. 14a and 14b show a slightly modified type of the pipe joint assembly shown in FIGS. 13a and 13b. The arrangement shown in FIG. 14a includes a clamping coil 89 made of resilient metal wire having a relatively large diameter. The free ends of the coil 89 are somewhat spaced from each other as shown in FIG. 14b and extend outwardly to define a pair of handles. The handles may be moved to each other to reduce the diameter of the coil 89 for its insertion through the packing.

Several forms of type B(a) packing members are mainly illustrated in FIGS. 15a through 21b. A principal feature of this type of packing is that it includes at its outer periphery an O-ring shaped portion replacing the outer wall of type A packing.

Figure 15A:
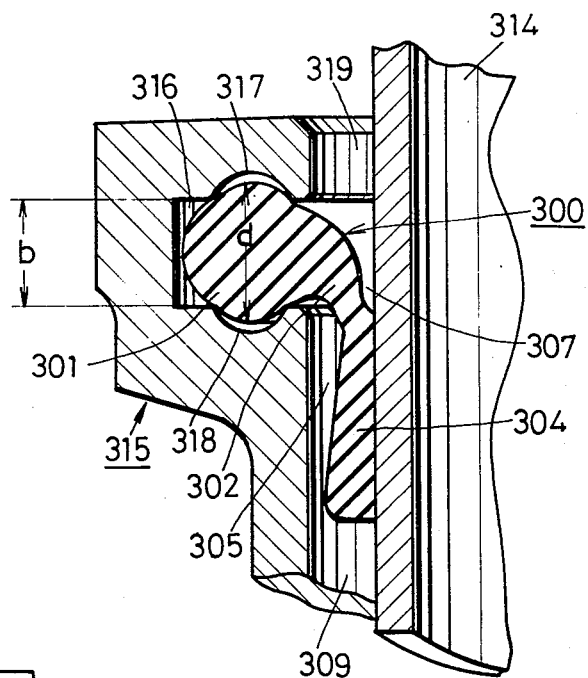
FIG. 15a is a fragmentary longitudinal sectional view illustrating a second preferred embodiment of the flexible packing of this invention having an O-ring shaped outer peripheral portion, in which the packing is shown in its installed position between a pipe and a pipe joint.
Figure 15B:
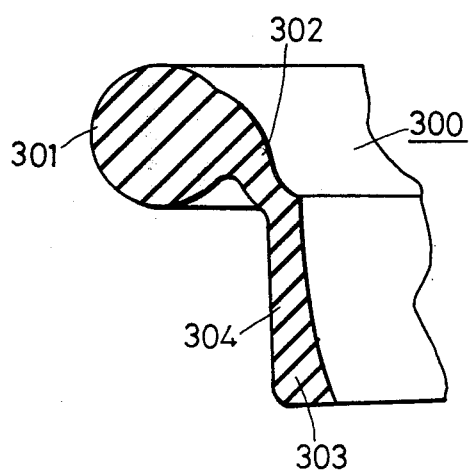

Referring particular to FIGS. 15a and 15b, there is shown a basic form of type B(a) packing generally indicated at 300 and associated with a pipe joint 315 to hold a pipe 314 in a fluid-tight fashion. The packing 300 comprises an O-ring shaped outer peripheral portion 301, a flexible intermediate connecting portion 302 extending axially and inwardly from the inner edge of the O-ring shaped portion 301 and formed in the shape of an elephant's trunk in longitudinal section and concave towards said clearance and pipeline, and a cylindrical inner peripheral portion 304 depending from the intermediate connecting portion 302. As shown in FIG. 15a and FIG. 15b, there is a line of demarcation between the intermediate connecting portion 302 and the inner peripheral sealing portion 304. The inner peripheral portion 304 has a gradually increasing wall thickness toward its free end to define a clamping end 303. The pipe joint 315 has an annular end wall defining at its center a circular end opening 319 through which the pipe 314 extends into the packing 300. The pipe joint 315 includes an annular groove 316 formed inwardly of its end wall and opening toward the pipe 314. The annular groove 316 has an axial length or breadth b which is somewhat smaller than the diameter of the O-ring shaped portion 301 of the packing 300, whereby the O-ring shaped portion 301 is securely held in the annular groove 316. A pair of oppositely disposed annular recesses 317 and 318 are formed in the two mutually facing annular surfaces of the groove 316 to reinforce the fluid-tight engagement between the O-ring shaped portion 301 and the pipe joint 315, while preventing any unintentional removal of the packing 300 from the pipe joint 315. Alternatively, those annular surfaces of the groove 316 may be flat. The pipe 314 extends beyond the inner end of the packing 300 into the pipe joint 315 and is adjustably positioned relative to the packing 300. Due to its elasticity, especially, because of the action of the clamping end 303, the inner wall portion 304 of the packing 300 is closely held against the outer surface of the pipe 314 to maintain an effective fluid-tight contact therebetween. The pipe joint 315 defines a generally cylindrical clearance 305 between its inner surface and the outer surface of the packing inner wall portion 304, as well as a larger cylindrical space 309 between its inner surface and the outer surface of the pipe 314. The trunk shaped intermediate portion 302 of the packing 300 defines an outwardly diverging clearance 307 encircling the pipe 314 and communicating with the pipe joint end opening 319. A part of the fluid flowing through the pipe 314 flows into the cylindrical clearance 305 and as its pressure increases, the fluid acts upon the inner wall portion 304 of the packing 300 to press it against the pipe 314 with an increased tightness. Any reasonable positional change of the pipe 314 relative to the packing 300 may be easily obtained or compensated for by the flexibility of the packing 300, especially of its intermediate portion 302, and the ability of the pipe 314 to axially displace itself through the packing, without disturbing the necessary fluid-tight connection. This adjustment is further assisted by the presence of the free space 309 and the clearance 307 adjacent to the opposite ends of the packing 300.

A number of modified forms of the packing shown in FIGS. 15a and 15b will be described with reference to several drawing figures. Referring to FIGS. 16a and 16b, there is shown a packing member 320 associated with a pipe joint 335 to adjustably support a pipe 334. The packing 320 is characterized by its inner wall portion 324 having an outwardly projecting annular rib 326 at its free end. Upon insertion of the pipe 334 through the packing 320 by radially expanding its inner wall portion 324, the annular rib 326 engages the inner surface of the pipe joint 335 to thereby strengthen the sealing contact between the packing 320 and the pipe 334. The annular rib 326 has no recess formed along its outer periphery, but defines a totally closed, generally cylindrical space 325 between the inner surface of the pipe joint 335 and the outer surface of the packing inner wall portion 324. The advantages of this arrangement will later be described.

FIGS. 17a and 17b illustrate a further modified packing member 350 associated with a pipe joint 365 to support a pipe 364. The packing 350 comprises an O-ring shaped outer peripheral portion 351 securely received in an annular groove 366 in the pipe joint 365 by a pair of annular recesses 367 and 368 each having a part-circular cross section. The packing 350 is particularly characterized by its inner wall portion 354 having an outwardly projecting annular rib 356 intermediate the ends thereof and having a gradually decreasing wall thickness toward its free end 353. Adjacent to its annular rib 356, the inner wall portion 354 is joined to a trunk shaped intermediate portion 352 which is in turn joined with the inner periphery of the O-ring shaped portion 351. Upon insertion of the pipe 364 through the packing 350, the annular rib 356 closely engages a cooperating annular shoulder 369 formed on the inner surface of the pipe joint 365 and defines an annular closed space 355 surrounded by the intermediate portion 352 of the packing 350 and the inner surface of the pipe joint 365. Adjacent to the inner end of the packing 350, there is shown a cylindrical free space 359 encircling the pipe 364 and communicating with the interior thereof. The trunk shaped packing intermediate portion 352 defines an outwardly diverging open space 357 encircling the pipe 364 on the opposite side of the packing 350 from the inner free space 359.

Referring to FIG. 18, there is shown a packing member 350' which is a slightly modified type of the structure shown in FIG. 17b. The packing 350' is characterized by its intermediate connecting portion 352' which is formed with uniform wall thickness, instead of being in the shape of a trunk. A principal advantage of this structure is an enlarged flexibility of the packing 350' which facilitates insertion of its O-ring shaped portion 351' into an annular groove in a pipe joint. It will, however, be noted that the shape of the intermediate connecting portion of the packing may be varied in a variety of ways as required or preferable to suit the type of fluid in an associated pipeline, its pressure and other factors.

Figure 19:
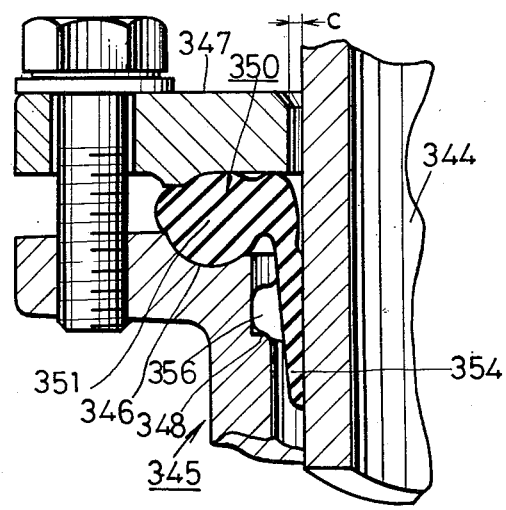
FIG. 19 is a fragmentary longitudinal sectional view illustrating in an assembled position a different modified form of the packing shown in FIG. 15a, the packing being held in position by a packing gland.

Attention is now directed to FIG. 19 illustrating a modified pipe joint assembly which facilitates positioning of a type B(a) packing member without causing any undue flexure or deformation thereto during its insertion. In FIG. 19, there is shown a packing member 350 associated with a pipe joint 345 to support a pipe 344. The packing 350 comprises an O-ring shaped portion 351 received in an annular recess 346 having an arcuate cross section formed on the radially outwardly extending end wall of the pipe joint 345, a depending inner wall portion 354 closely contacting the pipe 344 and an annular rib 356 projecting outwardly from the inner wall portion 354 and engaged with an annular shoulder 348 formed in the inner surface of the pipe joint 345. The assembly of FIG. 19 is characterized by including a packing gland 347 encircling the pipe 344 and bolted to the end wall of the pipe joint 345 with the packing 350 therebetween. The packing gland 347 includes an annular concave inner surface which is generally complementary to an adjacent outer surface of the O-ring shaped portion 351 of the packing 350 and cooperates with the annular recess 346 of the pipe joint 345 to hold the packing 350 securely in position. The bolts may be suitably adjusted to hold the pipe joint 345, the packing gland 347 and the packing 350 together in a satisfactory fluidtight fashion without imparting any unreasonable load to the O-ring shaped portion 351 of the packing 350.

The arrangement in which a packing gland is used to hold a packing member against a pipe joint is advantageous in that the packing member does not necessarily need to be positioned against the pipe joint by the packing gland prior to insertion of an associated pipe. Taking the arrangement of FIG. 19 for example, it advantageously facilitates pipeline connection without causing any undue deformation to the packing 350. The packing 350 and the packing gland 347 may first be inserted together over the pipe 344, then the pipe 344, together with the packing 350, may be inserted into the pipe joint 345 and finally the bolts may be tightened. The packing gland 347 has a relatively large radial width defining a relatively small clearance c around the pipe 344 and which provides a relatively large inner gland surface contacting the packing 350 to prevent any unintentional removal thereof upon any large increase in fluid pressure or any outward axial displacement of the pipe 344. The small clearance c encircling the pipe 344 restricts angular movement of the pipe 344 to a reasonable degree.

Figure 20A:
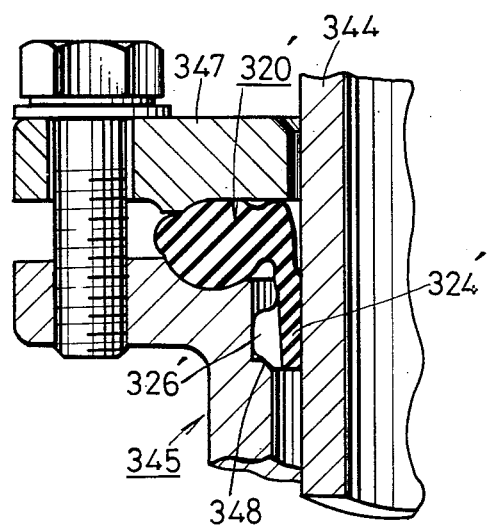
FIG. 20a is a view similar to FIG. 19 and showing a slightly modified form of the packing shown therein.
Figure 20B:
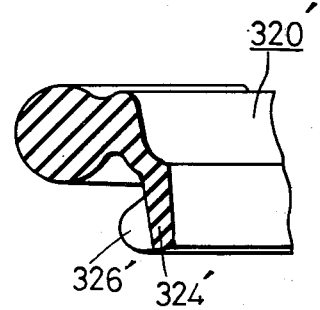
FIG. 20b is a fragmentary longitudinal sectional view showing the packing per se of FIG. 20a in its position prior to installation.

FIG. 20a illustrates a slightly modified form of the arrangement shown in FIG. 19. There is shown a slightly modified packing member 320' held by a similar packing gland 347 against a similar pipe joint 345 to support a similar pipe 344. As also shown in FIG. 20b, the packing 320' is characterized by including an annular rib 326' projecting outwardly from the free end of its inner wall portion 324'.

Figure 21A:
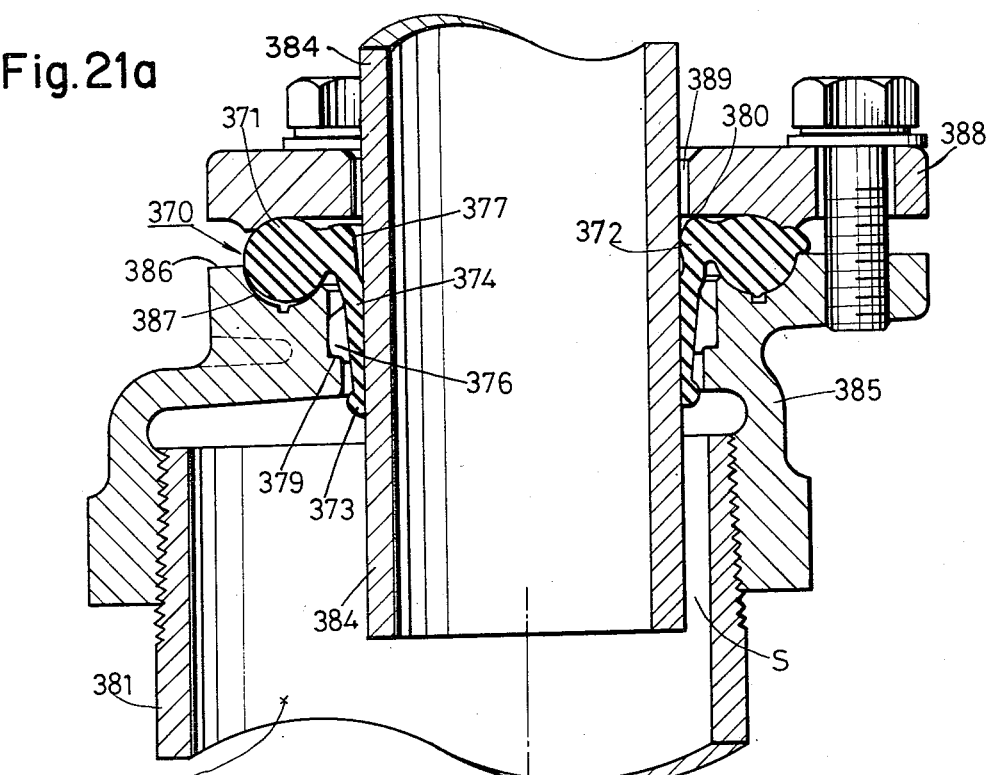
FIG. 21a is a partly omitted longitudinal sectional view illustrating one form of the entire pipe joint assembly in which a slightly modified form of the packing shown in FIG. 19 is used and held in position by a packing gland.
Figure 21B:
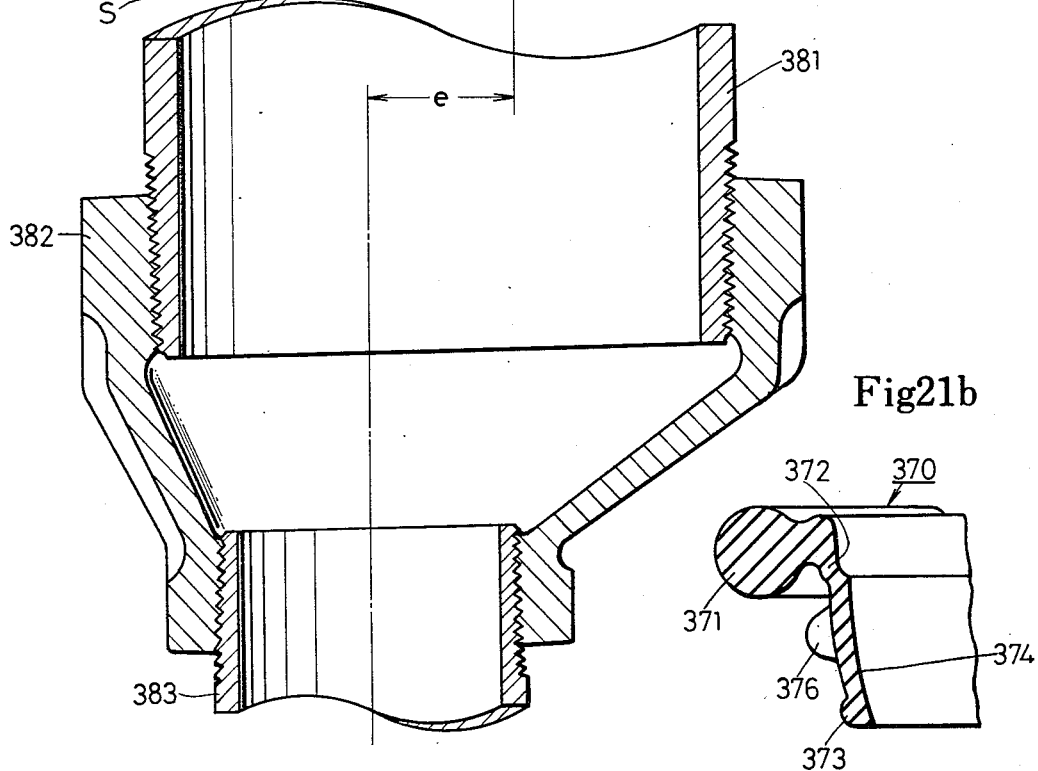
FIG. 21b is a fragmentary longitudinal sectional view showing the packing per se of FIG. 21a in its position prior to installation.

Referring to FIGS. 21a and 21b, a packing member 370 is associated with a different type of arrangement adapted to connect a pair of pipes 383 and 384 in an eccentric fashion. The arrangement includes a specially shaped pipe joint 385 having a pair of opposite end openings which are eccentric to each other. One end opening of the pipe joint 385 is defined by an end wall 386 having an annular groove 387 having an arcuate cross section which encircles one pipe 384 coaxially therewith. The packing 370 comprises an O-ring shaped portion 371 held securely in the annular groove 387 of the pipe joint 385 by a packing gland 388 bolted to the end wall 386 of the pipe joint 385. The packing 370 also includes an inner wall portion 374 axially extending from the O-ring shaped portion 371 and having an increased thickness clamping end 373. An annular rib 376 projects outwardly from the inner wall portion 374 and is engaged by an annular shoulder 379 formed in the inner surface of the pipe joint 385 to urge the inner wall portion 374 closely against the pipe 384. A flexible funnel-shaped intermediate portion 372 connects the O-ring shaped portion 371 and the inner wall portion 374 together and defines an outwardly diverging clearance 377 encircling the pipe 384 and communicating with the central opening 389 of the packing gland 388. The other end opening of the pipe joint 385 is considerably larger in diameter than its one end opening and is eccentric to the pipe 384. An interconnecting pipe 381 having a large diameter relative to the pipe 384 is threadedly connected into the other end opening of the pipe joint 385 at one end and defines a generally cylindrical free space S having a considerably larger radial width on one side of the pipe 384 than on the opposite side thereof and encircling the inner end 384' of the pipe 384. The other end of the interconnecting pipe 381 is threadedly connected into one end of a specially shaped pipe joint 382 of varying diameter. The pipe joint 382 is generally tapered toward its other end which is positioned eccentrically relative to the one end thereof. One end of the other pipe 383 is threadedly connected into the other end of the pipe joint 382. The length of the interconnecting pipe 381 depends on the distance for which it is required to compensate when connecting the two pipes 383 and 384. It will be observed that the arrangement of FIG. 21a facilitates connection of a pipeline comprising a pair of eccentrically extending pipes 383 and 384 having an axial deviation e therebetween. Moreover, the specially shaped pipe joint 385 and the packing 370 associated therewith permit, because of their slidability relative to one pipe 384 and the flexibility of the packing 370, easy pipeline connection in spite of any possible longitudinal or angular difference or variation in the pipe 384 relative to the other pipe 383. The central opening 389 is relatively small in diameter as compared with the pipe 384, so that the packing 370 is securely held by the inner surface of the packing gland 388 and prevented from any unintentional removal through the opening 389 of the packing gland 388. The inner surface 380 of the packing gland 388 may be flat or of any other shape to best suit a particular packing structure to hold it in position and protect it against any undue deformation.

The specially shaped pipe joint 385 shown in FIG. 21a may be modified in construction in a variety of manners as disclosed in my copending patent application. Such various forms of pipe joints may advantageously be used in combination with the flexible packing of this invention to accomplish effective fluid-tight pipeline connection.

Figure 22A:
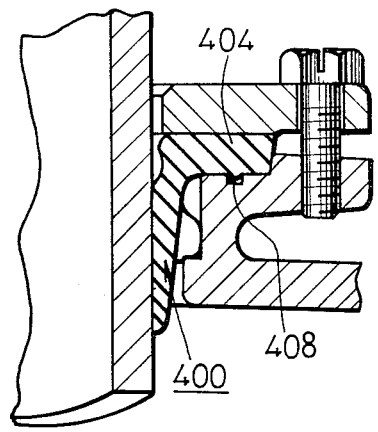
FIG. 22a is a fragmentary longitudinal sectional view illustrating in an assembled position a basic form of the packing according to a third preferred embodiment of this invention, having a generally laterally extending flange portion.
Figure 22B:
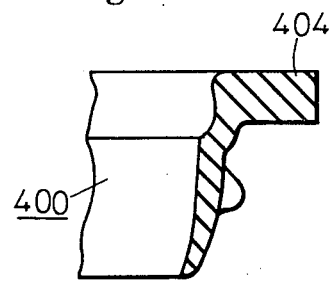
FIG. 22b is a fragmentary longitudinal sectional view showing the packing per se of FIG. 22a in its position prior to installation.

Attention is now directed to type B(b) packing members each having a modified outer peripheral portion shaped like a radially outwardly extending flange or end wall as shown in a variety of forms in several drawing figures. Type B(b) packing is particularly adapted for use with a packing gland and its flange or end wall portion includes a generally flat surface which is complementary to an associated surface of the packing gland. Referring to FIGS. 22a and 22b particularly, there is shown a basic form of type B(b) packing generally indicated at 400. The packing 400 is characterized by including at one end a radially outwardly extending annular flange or end wall 404 which has a flat outer surface contacting the inner surface of an associated packing gland in a fluid-tight fashion and constitutes an outer peripheral means for sealingly engaging the packing gland. In other respects, it is substantially identical to the packing 350 described with reference to FIG. 19. The opposite surface of the end wall portion 404 is also generally flat, but includes an annular rib received in an annular groove 408 formed in an adjacent pipe joint surface. More particularly, the packing 400 will be seen to have an inner peripheral wall portion sealingly engaging the pipeline, which is connected to the outer peripheral wall 404 by an intermediate portion which is the same as the intermediate portion 2 described in connection with FIGS. 1a and 1b, 2a, 2c, etc.

Figure 23A:
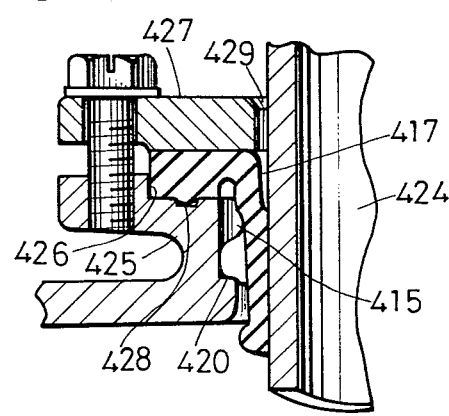
Figure 23B:
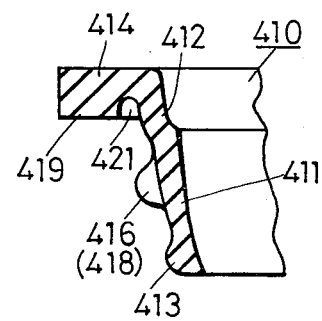
FIG. 23b is a view similar to FIG. 22b, turned 180 degrees, showing the packing per se of FIG. 23a, in its position prior to installation.
Figure 24A:
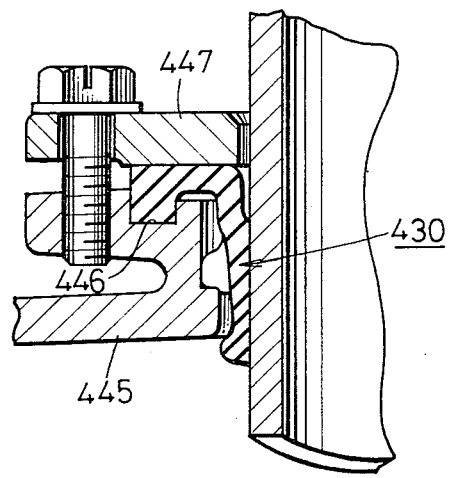
FIG. 24a is a view similar to FIG. 23a and showing a slightly modified form of the packing shown therein.
Figure 24B:
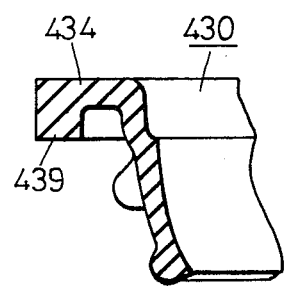

FIGS. 23a and 23b illustrate a slightly modified packing member 410 held against a pipe joint 425 by a packing gland 427 to support a pipe 424. The packing 410 comprises an axially extending inner wall portion 411 closely contacting the pipe 424, an inwardly curved intermediate connecting portion 412 and a radially outwardly extending annular end wall portion 414 having a flat outer surface closely contacting the inner surface of the packing gland 427. The inner wall portion 411 terminates in an increased thickness clamping end 413 and includes a radially outwardly projecting annular rib 416 resting against an annular shoulder 420 formed in the inner surface of the pipe joint 425. The annular rib 416 is formed with a plurality of recesses 418 along its outer circumference. The end wall portion 414 includes an axially extending annular projection 419 encircling the intermediate connecting portion 412 and defining an annular groove 421 therebetween. The annular groove 421 forms a part of a generally closed space 415 encircling the intermediate connecting portion 412, which in turn defines an outwardly diverging clearance 417 encircling the pipe 424 and communicating with the central opening 429 of the packing gland 427. The annular projection 419 is closely engaged with an annular recess 426 formed in the adjacent end surface of the pipe joint 425. The annular recess 426 includes an annular groove 428 into which a portion of the annular projection 419 engages when the packing gland 427 is tightly bolted to the pipe joint 425. Referring to FIGS. 24a and 24b, there is shown a packing member 430 which is substantially identical to the structure shown in FIGS. 23a and 23b. The packing 430 includes a radially outwardly extending annular end wall 434 having an axially extending annular projection 439 which is securely engaged by a packing gland 447 in an annular groove 446 formed in one end surface of a pipe joint 445.

Figure 25A:
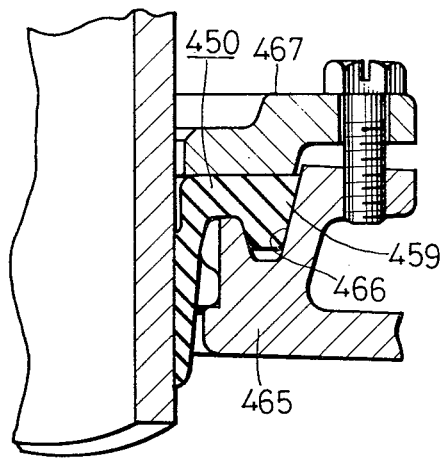
FIG. 25a is a view similar to FIG. 24a, turned 180 degrees, showing a slightly modified form of the packing shown therein.
Figure 25B:
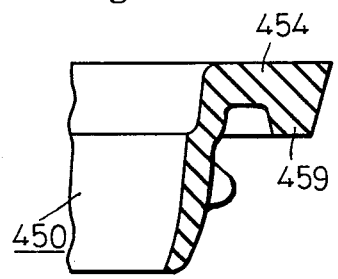

FIGS. 25a and 25b illustrate a packing member 450 which is a slightly modified form of the structure shown in FIGS. 24a and 24b. The packing 450 includes a radially outwardly extending end wall 454 having an axially extending annular projection 459. The annular projection 459 has a trapezoidal cross-sectional configuration and is closely engaged by a packing gland 467 in an annular groove 466 formed in one end surface of a pipe joint 465 and having a trapezoidal or tapered cross section which is complementary to the annular projection 459 to facilitate sealing engagement between the packing 450 and the pipe joint 465.

Figure 26A:
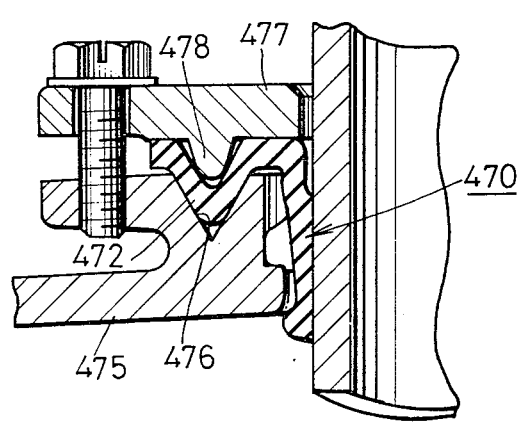
FIG. 26a is a view similar to FIG. 25a, turned 180 degrees, showing a modified form of the packing shown therein.
Figure 26B:
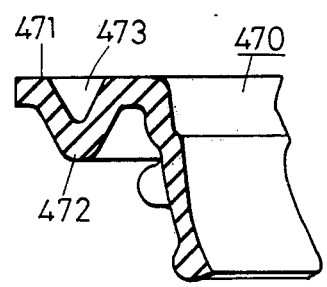

FIGS. 26a and 26b illustrate a further modified packing member 470 which is characterized by the uniquely curved configuration of its radially outwardly extending end wall 471. The end wall 471 includes a V-shaped portion 472 which defines an annular groove 473 having a triangular section as shown in FIG. 26b. The annular groove 473 is adapted to receive therein an annular projection 478 formed in the inner surface of a packing gland 477 and having a tapered section. An associated pipe joint 475 has an end surface in which an annular groove 476 having a triangular section is formed, and the V-shaped portion 472 of the packing 470 is closely engaged in the annular groove 476 by the annular projection 478 of the packing gland 477, so that very effective sealing engagement is obtained between the packing 470 and the pipe joint 475.

Figure 27A:
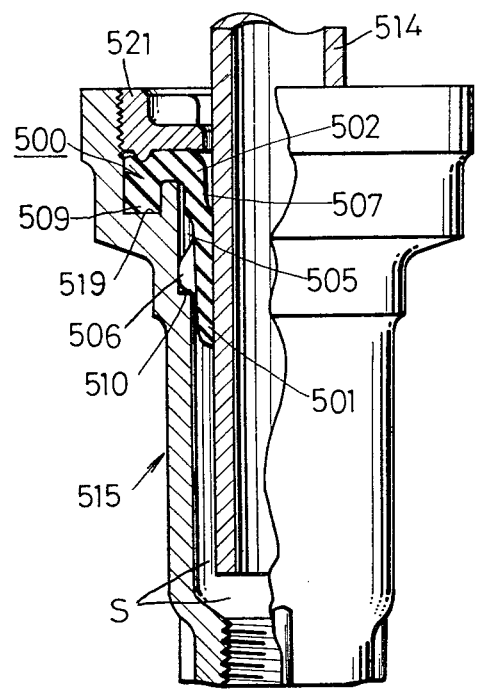
FIG. 27a is a front elevational view, partly in section, of a pipe joint assembly utilizing a packing structure similar to that of FIG. 24a and which is held in position by a threaded packing gland.
Figure 27B:
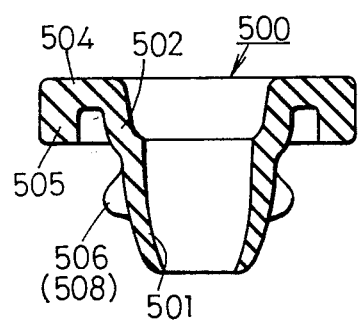
Figure 27C:
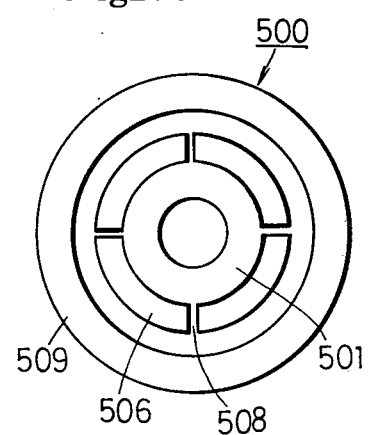

Reference is now made to FIGS. 27a through 27c illustrating a packing member 500 which is substantially identical to the structure shown in FIG. 24a and which is held against a pipe joint 515 by a different type of packing gland 521. One pipe 514 extends through the packing 500 into the pipe joint 515 and its inner end is encircled by a generally cylindrical free space S. The packing 500 comprises an axially extending, generally cylindrical inner wall portion 501 closely contacting the pipe 514, a radially outwardly extending annular end wall 504 having an axially extending annular projection 505, and a highly flexible intermediate connecting portion 502 which is curved inwardly and extends between the inner wall portion 501 and the end wall 504. The inner wall portion 501 includes an outwardly projecting annular rib 506 which is formed with a plurality of recesses 508 along its circumference. The pipe joint 515 is provided adjacent to one end thereof with an annular groove 519 encircling the intermediate connecting portion 502 of the packing 500, and in which the annular end wall projection 505 is securely received. Inwardly of the annular groove 519, the pipe joint 515 includes an inner annular shoulder 510, against which the annular rib 506 of the packing 500 rests to define a generally closed annular space 520 between the packing 500 and the pipe joint 515. The inwardly curved packing 500 defines an outwardly diverging clearance 507 encircling the pipe 514 and communicating with the central opening of the packing gland 521. The other end of the pipe joint 515 is reduced in diameter for threaded connection with another pipe not shown. Due to the generally and not totally closed nature of the space 520 between the packing 500 and the pipe joint 515, a part of the fluid flowing into the space S encircling the pipe 514 flows through the recesses 508 into the space 520 and urges the intermediate connecting portion 502 of the packing 500 toward the pipe 514 to thereby improve a sealing contact between the packing 500 and the pipe 514 with elevation in fluid pressure. It is, however, to be noted that the annular rib 506 of the packing 500 does not necessarily need to be formed with recesses 508, but that it is sufficient to provide such recesses of the number and shape required to suit the fluidity and pressure of fluid for which a particular pipeline is intended for use.

Referring to FIGS. 28a through 28c, there is shown a modified packing member 550 having a higher flexibility. The packing 550 is particularly characterized by including a zigzag shaped intermediate connecting portion 552 which provides the packing 550 with a higher degree of flexible deformability. The packing 550 is further featured by including a pair of axially spaced annular ribs 556 and 576 outwardly projecting from its inner wall portion 551. The packing 550 also includes a radially extending annular end wall 554 having an axially extending annular peripheral projection 559 having a square cross section. The packing 550 is held against a pipe joint 565 by a threaded packing gland 571 to support a pipe 564 in a longitudinally and angularly adjustable manner. The pipe joint 565 includes an annular groove 569 in which the annular peripheral projection 559 of the packing 550 is sealingly received. The pipe joint 565 further includes an inwardly projecting annular rib 560 against which the annular rib 556 of the packing 550 rests closely to hold the inner wall portion 551 back against the pipe 564. The other annular rib 576 of the packing 550 is inwardly spaced from the inner surface of the pipe joint 565 and is positioned adjacent to the free end of the packing 550 to serve as a clamping end for the packing 550 against the pipe 564. The packing gland 571 has a central circular opening 579 through which the pipe 564 extends into the packing 550. The thickness of the gland 571 is gradually decreased toward its inner periphery to define an inverted dish-shaped clearance 577 encircling the pipe 564 between the packing 550 and the packing gland 571. The clearance 577 allows for a certain degree of outward displacement of the packing 550 upon axial outward displacement of the pipe 564. The angular movement of the pipe 564 which is available within the limits of the diameter of the packing gland opening 579 may effectively be obtained as the packing 550 quickly responds by angular rotation about the intermediate annular rib 556 due to the flexibility of the intermediate connecting portion 552. The zigzag shaped intermediate connecting portion 552 quite effectively permits axial displacement of the pipe 564 by its quick expansion or contraction and is particularly useful in adapting the packing 550 to any sudden change in fluid pressure that may be caused by a water hammer or the like, whereby any substantial fatigue of the packing 500 can be prevented. The annular rib 560 of the pipe joint 565 is positioned between the two annular ribs 556 and 576 of the packing 550 to restrict any excessive axial displacement of the packing 550. The packing gland 571 includes an axially projecting annular rib 572 engaging the end wall 554 of the packing 550 to hold the packing 550 in place within the pipe joint 565. The other end 567 of the pipe joint 565 is reduced in diameter and internally threaded to receive another pipe not shown.

Attention is directed to FIG. 29 illustrating a specially shaped pipe joint 516 having a pair of symmetrically disposed opposite ends. The arrangement of FIG. 29 includes a pair of packing members 500 and 500' disposed at the opposite ends, respectively, of the pipe joint 516 and is adapted to support a pair of pipes 514 and 514' adjustably. The packing members 500 and 500' and a pair of packing glands 521 associated therewith are identical in construction to those shown in FIG. 27a. The pipe joint 516 includes a pair of cylindrical free spaces S and S' encircling the inner ends of the two pipes 514 and 514', respectively. It will be noted that the arrangement of FIG. 29 provides a substantially doubled degree of axial or angular adjustability for the pipes as compared with that shown in FIG. 27a in which one of the pipes is threadedly connected to the pipe joint.

It will be noted that due to its special structure and excellent flexibility and elasticity, the packing of this invention can effectively seal a joint in a pipeline without causing any excessive stress to the associated pipe and pipe joint member both made of rigid material over a long period of time, while the packing itself also has an excellent durability over an extended period of time.

It will be observed from the foregoing description that a variety of different forms of packing glands are preferably used to hold various forms of the packing of this invention effectively against various forms of specially shaped pipe joint members. Referring particularly to type B(b) packing, it is usual practice to bolt a generally annular packing gland to an end wall of a pipe joint member with the radially outwardly extending end wall portion of the packing secured therebetween. The inner surface of the packing gland where it contacts the packing is preferably provided with one or more annular ribs or grooves of the coaxial construction adapted to engage the adjacent packing surface and prevent any unintentional removal of the packing through the packing gland. The packing gland has a central circular opening having a diameter which is large enough to leave a suitable width of annular clearance encircling an associated pipe to allow for a reasonable amount of axial or angular difference or variation in the pipe relative to another pipe to be connected with the first mentioned pipe. The method of connecting a packing gland to a pipe joint member by bolts advantageously simplifies the structure of the packing gland and accomplishes effective sealing. It is, however, possible that one bolt may be tightened with a stronger force than another with a resultant uneven load application to the packing, and the bolts are disadvantageously liable to rust or corrosion. These drawbacks may be obviated by a cap or box nut type packing gland or a threaded plug type gland. The cap or box nut type packing gland is, however, unsatisfactory because it tends to be loosened by an external force. Accordingly, the threaded plug type packing gland, of which a number of forms have been described with reference to the corresponding drawing figures. The threaded plug type packing gland may, however, prove unsatisfactory in certain cases because of its direct contact with an associated packing surface and its tendency to distort the packing to an undue extent when it is rotated and tightened. The same disadvantage exists with the cap nut type packing gland.

These disadvantages may effectively be obviated by utilizing the arrangements illustrated in FIGS. 30 through 36. Referring to FIG. 30, there is shown a washer 584 interposed between a packing member 500 and a packing gland 581. The washer 584 has a central circular opening having a diameter which is somewhat larger than the outer diameter of a pipe 514 to allow for positional adjustment of the pipe 514. The packing gland 581 is provided on the inner surface thereof with a pair of coaxial annular ribs 582 and 583 which provide the only points of direct contact between the packing gland 581 and the washer 584 to thereby facilitate rotation of the packing gland 581 relative to the washer 584 when the packing gland 581 is tightened.

Figure 31:
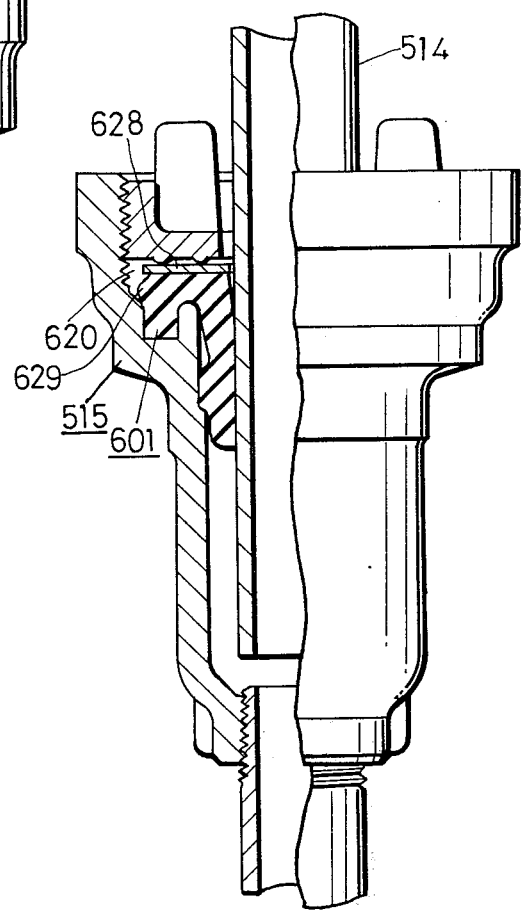
FIG. 31 is a view similar to FIG. 30 and showing a somewhat modified pipe joint assembly utilizing a modified form of the packing shown in FIG. 30 and which is suitable for use under relatively high pressure.

FIG. 31 illustrates a slight different arrangement. A washer 628 has an outer periphery spaced from the inner surface of a pipe joint 515 to define an annular clearance 620 therebetween. A packing member 601 has a chamfered outer peripheral edge 629 which facilitates radial displacement of the packing 601 into the annular clearance 620 upon radial displacement of a pipe 514. Referring to FIGS. 32a and 32b, there is shown a packing member 651 having an axially extending annular projection 654 having a tapered cross section. The annular projection 654 is closely engaged by a packing gland 621 in a complementary annular groove 666 in a pipe joint 665. A washer 668 is interposed between the packing gland 621 and the packing 651. The packing 651 includes a clamping end portion 653 closely contacting a pipe 664 and an outwardly projecting annular rib 656 resting against an annular shoulder 660 in the pipe joint 665, whereby the packing 651 achieves its sealing objective both on the inner and outer surfaces thereof. The packing 651 further includes a flexible intermediate connecting portion 652 of uniform thickness having a relatively gently sloping inner surface which defines a relatively small clearance 657 around the pipe 664. The packing 651 is, thus, particularly adapted to withstand a high fluid pressure and because of its structure, it is not liable to any excessive deformation that may cause excessive fatigue to the packing material. The packing gland 621 includes a pair of tabs 623 by which the gland 621 is tightened into the pipe joint 665. The inner peripheral surface 626 of the packing gland 621, including those of the tabs 623, is outwardly inclined to some extent, say, at about 3 degrees relative to the pipe 664, but depending on the situation where a pipeline is installed. This outwardly inclined inner surface of the packing gland 621 allows for angular rotation of the pipe 664 about the annular rib 656 of the packing 651 to the extent of its inclination. Any further rotation or inclination of the pipe 664 is, however, prevented by the packing gland 621 and the inner surface 626 of the packing gland 621 bears thereon the weight of the pipe 664 or any load created by the inclination of the pipe 664, whereby any undue stress or deformation of the packing 651 may be effectively prevented.

FIG. 33 illustrates a different type of arrangement employing a washer between a packing member 601 and a packing gland 621. The arrangement of FIG. 33 is particularly adapted for connecting a pair of pipes 614 and 635 of relatively large diameter and providing a relatively large free space between the inner ends of the pipes. The arrangement includes a specially shaped pipe joint 615 provided with a packing member 601 which is identical in construction to the structure shown in FIG. 31. The packing gland 621 and the washer are identical in construction to those shown in FIG. 31 and support the packing 601 against the pipe joint 615 in a manner identical to FIG. 31. One pipe 614 is adjustably supported on the packing 601. The pipe joint 615 is threadedly connected with one end of an interconnecting pipe 631 having a considerably larger diameter than the pipe 614. The interconnecting pipe 631 is long enough to provide a relatively large free space S therewithin. The other end of the interconnecting pipe 631 is threadedly connected into one end of another pipe joint 632 having a reduced diameter toward its other end. The other pipe 635 is threadedly connected into the other end of the other pipe joint 632.

Figure 34:
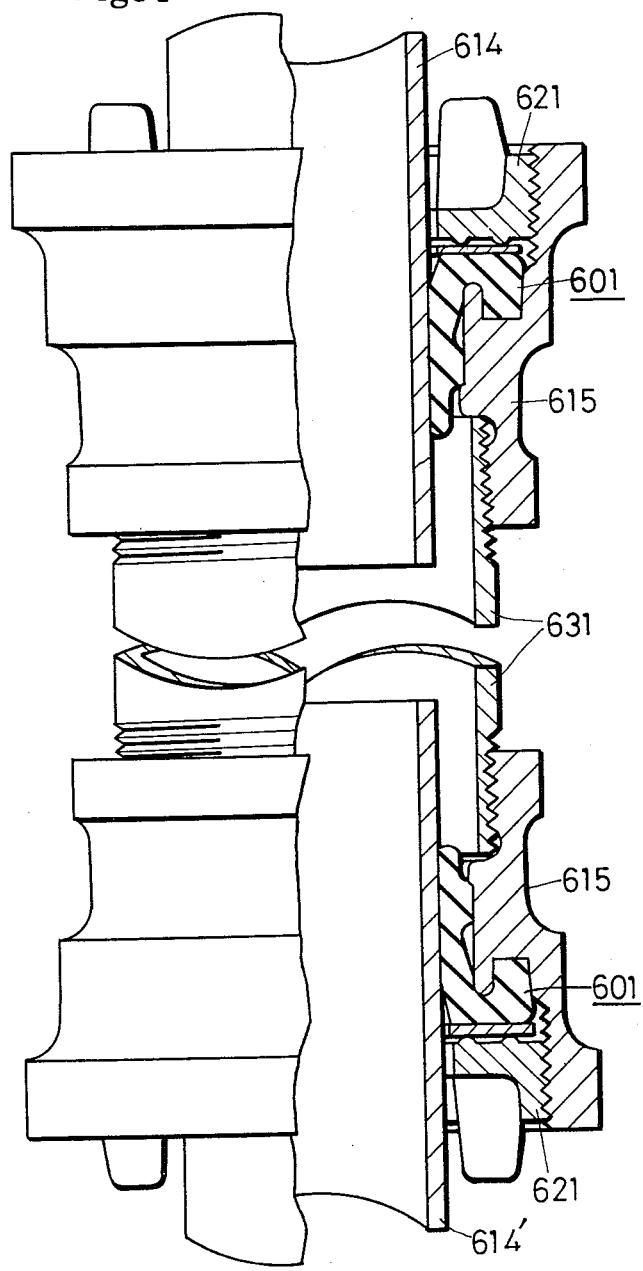
FIG. 34 is a view similar to FIG. 33, but showing a different large pipe joint assembly having a pair of symmetrically disposed end portions connected with each other by an interconnecting pipe, each of the end portions being provided with a piece of the packing shown in FIG. 33.
Figure 36:
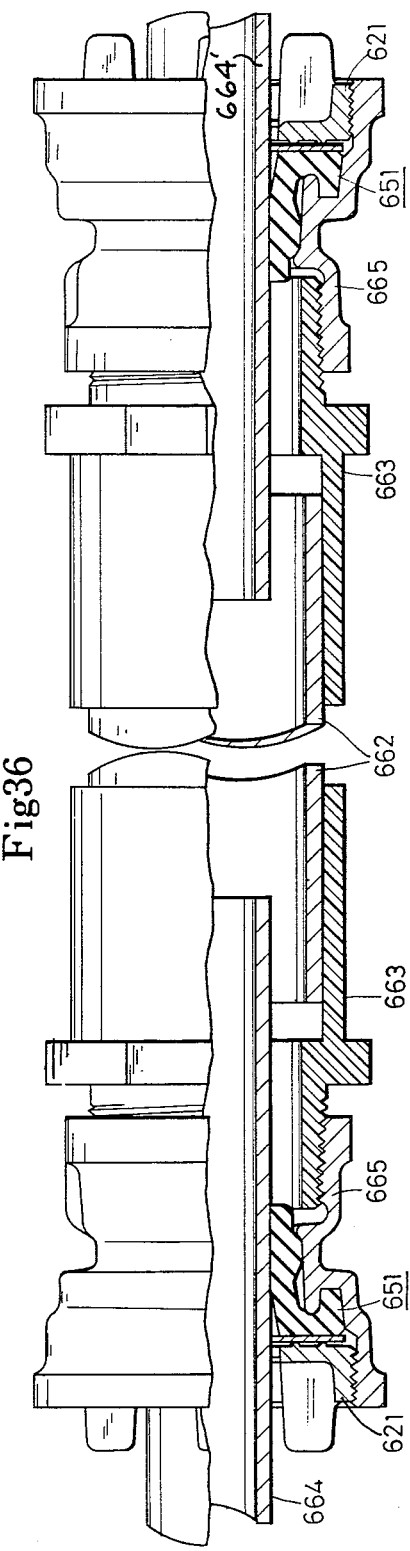
FIG. 36 is a partly omitted front elevational view, partly in section, illustrating a modified form of the assembly shown in FIG. 32a, including an interconnector made of plastic material connecting a pair of symmetrically disposed end joint members each provided with a packing member shown in FIG. 32b.
Figure 35:
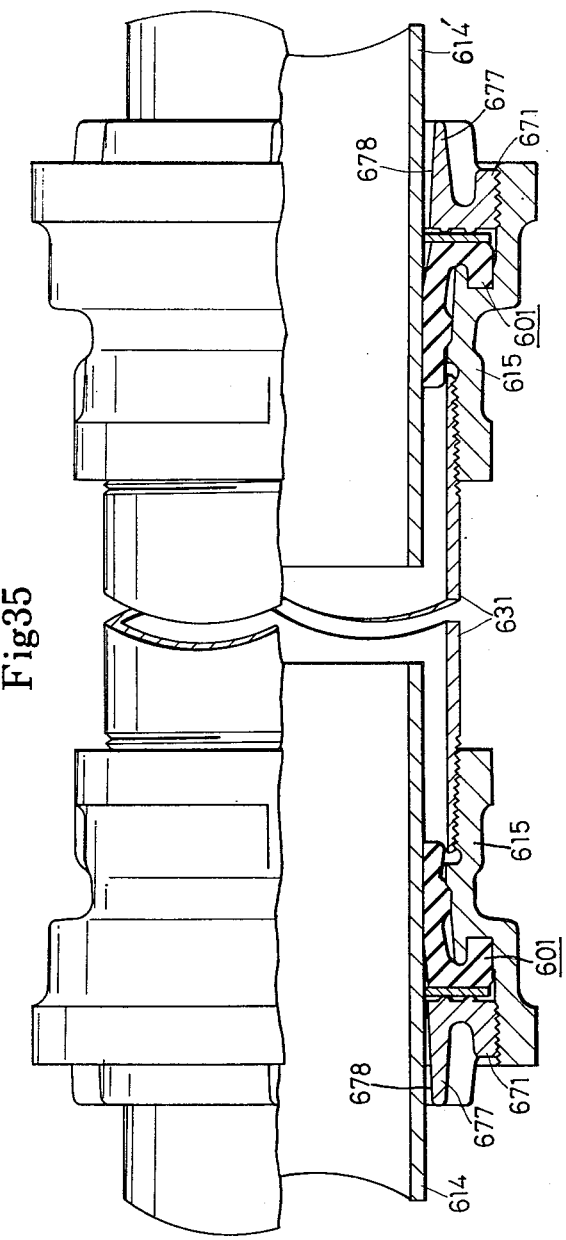
FIG. 35 is a front elevational view, partly in section, illustrating a slightly modified form of the assembly shown in FIG. 34, in which the same type of packing is used but is held in position by a different type of packing gland.

Referring to FIG. 34, there is shown a different type of arrangement adapted for connecting a pair of pipes 614 and 614' in such a manner that both of the pipes 614 and 614' are adjustable relative to each other. The arrangement includes a pair of specially shaped pipe joints 615 which are disposed at the opposite ends of the arrangement symmetrically to each other. The two pipe joints 615 are identical in construction to each other end and to the structure shown at top of FIG. 33. Each pipe joint 615 is provided with a packing member 601, a packing gland 621 and a washer interposed therebetween, all of which are constructed and positioned identically to their counterparts shown in FIG. 33. The two pipe joints 615 are connected with each other by an interconnecting pipe 631. It will be noted that the arrangement of FIG. 34 provides a substantially doubled capability of absorbing the longitudinal and angular differences or changes between the two pipes 614 and 614' as compared with the arrangement shown in FIG. 33. The arrangement shown in FIG. 35 is generally identical to that of FIG. 34, but employs a pair of different type packing glands 671. Each packing gland 671 is a generally double-walled cylindrical structure having a cylindrical inner wall 677 encircling a pipe 614 or 614'. The inner wall 677 has an outwardly diverging inner peripheral surface 678 which provides a relatively enlarged bearing surface for the pipe 614 or 614' upon angular displacement of the latter to prevent any localized load application or damage thereto. The enlarged inner surface 678 also prevents any unintentional removal of the pipe by virtue of its frictional engagement therewith. The arrangement illustrated in FIG. 36 is similar to that of FIG. 34 or 35, but employs somewhat different means for interconnecting a pair of pipe joints 665. The interconnecting means comprises an interconnecting pipe 662 into which a pair of pipes 664 and 664' extend and which is spaced apart from each pipe joint 665, and a pair of symmetrically disposed sockets 663. One of the sockets 663 is threadedly connected into one of the pipe joints 665 at one end, and the other end of the socket 663 is fitted over one end of the interconnecting pipe 662. The other socket 663 is threadedly connected into the other pipe joint 665 at one end and the other end of the other socket 663 is fitted over the other end of the interconnecting pipe 662. The sockets 663 are preferably made of plastics and in the event the associated pipe joints may be made of plastics, too, threaded connection therebetween may often be replaced by bonding with an adhesive. Each of the pipe joints 665 and its associated parts (packing and the like) are identical to those shown in FIG. 32a.

A couple of arrangements employing multi-way pipe joints and type B(b) packing members will be described with reference to FIGS. 37 and 38. Referring to FIG. 37, there is shown a three-way pipe joint 538 havig a pair of coaxial main ends and a side end which is generally perpendicular to the main ends. A pair of pipes 535 and 536 are coaxially connected with each other to form a main pipeline. One pipe 535 extends into one of the main ends of the pipe joint 538. A packing member 531 encircles the pipe 535 and is held in position by a packing gland 541 in a manner generally similar to the arrangement shown in FIG. 29. Another generally cylindrical pipe joint 539 is coaxially secured to the side end of the three-way joint 538. A third or branch pipe 537 forming a branch pipeline extends into the side end of the three-way joint 538 through the second joint 539. Another packing member 532 encircles the branch pipe 537 in the second joint 539 and is held in position by a packing gland 542 in a manner generally similar to the arrangement shown in FIG. 29. The other main pipe 536 extends into the other main end of the three-way joint 538. A cylindrical packing member 533 encircles the pipe 536 and the inner surface of the packing member 533 closely fits the outer surface of the pipe 536 along the entire axial length thereof. The packing member 533 includes a coaxial annular groove 533a having an inwardly tapered cross section and opening toward the exterior of the pipe joint 538. A complementary annular wedge 534 fits the annular groove 533a. A packing gland 543 is bolted to the other end of the pipe joint 538 and holds the wedge 534 closely against the packing member 533 to thereby hold the inner and outer surfaces of the packing 533 closely against the pipe 536 and the pipe joint 538, respectively. It will be noted that according the arrangement of FIG. 37, one main pipe 535 and the branch pipe 537 are longitudinally or angularly adjustable relative to the corresponding ends of the pipe joint 538, while the other main pipe 536 is practically immovably secured to the pipe joint 538.

The arrangement of FIG. 38 includes another three-way pipe joint 688 having a pair of main ends coaxially disposed to define a main pipeline comprising a pair of pipes 685 and 686. Fluid flows through the pipeline in the direction of the arrows shown in FIG. 38. The pipe joint 688 further includes a side end forming a branch pipeline comprising a branch pipe 687. This side end is directed at an angle of 45 degrees relative to the main end upstream of the main pipeline to connect the branch pipe 687 at a corresponding angle relative to the upstream main pipe 685. The upstream main end and the side end of the pipe joint 688 are identical to each other in construction. A packing member 681 encircles the upstream main pipe 685 and a packing gland 691 holds the packing 681 against the pipe joint 688. A washer 694 is interposed between the packing 681 and the packing gland 691. The inner wall portion 682 of the packing 681 closely contacts the pipe 685. The branch pipe 687 is maintained in a fluid-tight condition by a packing member 683 having an inner wall portion 684, a packing gland 692 and a washer 695 in a manner similar to the arrangement shown at the upstream main end of the pipe joint 688. The downstream main end of the pipe joint 688 is encircled by a cylindrical packing member 696 held in position by an annular wedge in a manner similar to that shown in FIG. 37. It will be observed from the arrangements of FIGS. 37 and 38 that the packing of this invention is preferably provided in an upstream portion of a pipeline. It should, however, be understood that the packing of this invention may effectively be employed in any other position along the pipeline if the fluid flowing in the pipeline does not contain any substantial quantity of foreign material, and flows at a relatively low velocity.

Figure 39:
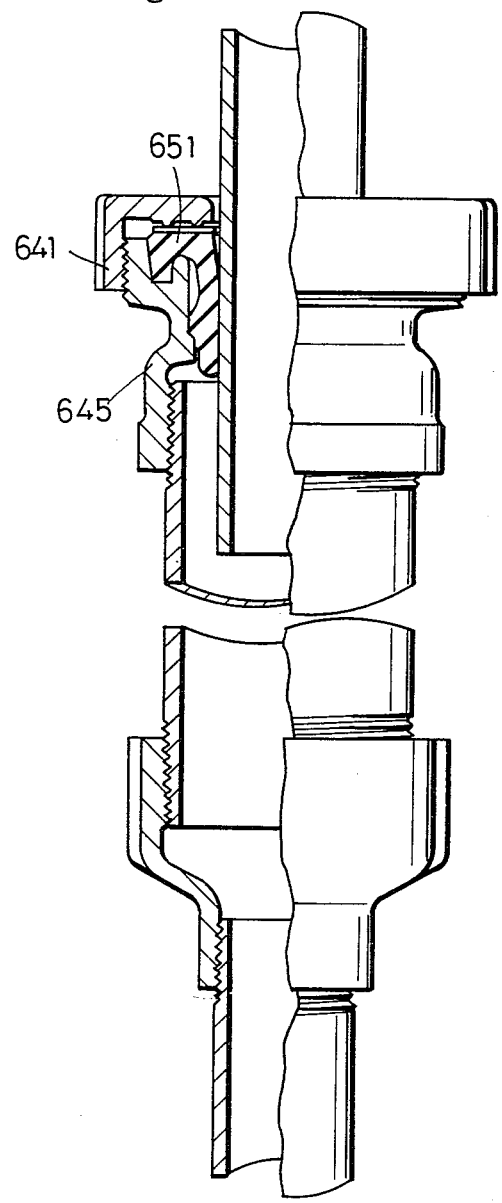
FIGS. 39, 40 and 41 are front elevational views, partly in section, illustrating three additional different pipe joint assemblies each including a packing member or members similar to that shown in FIG. 32a, but held in position by a different type of packing gland.
Figure 40:
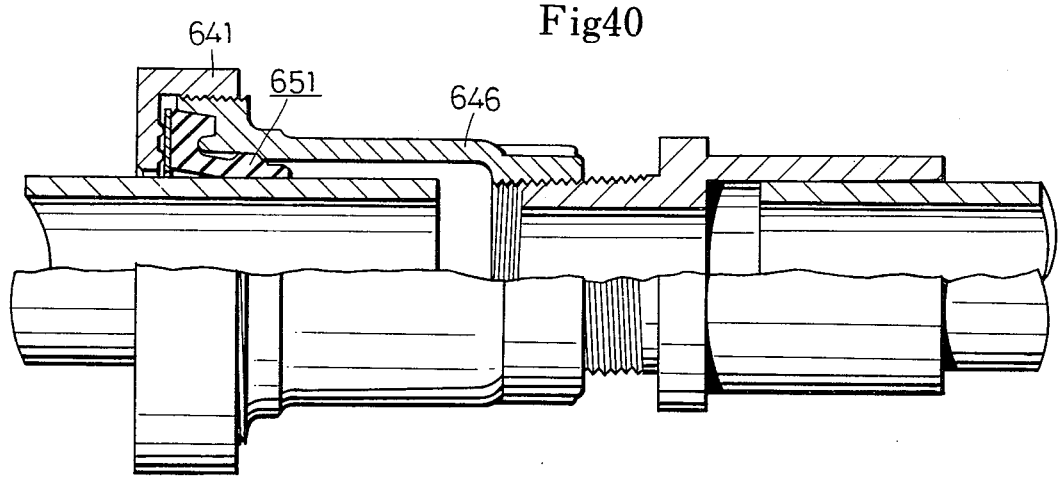
Figure 41:
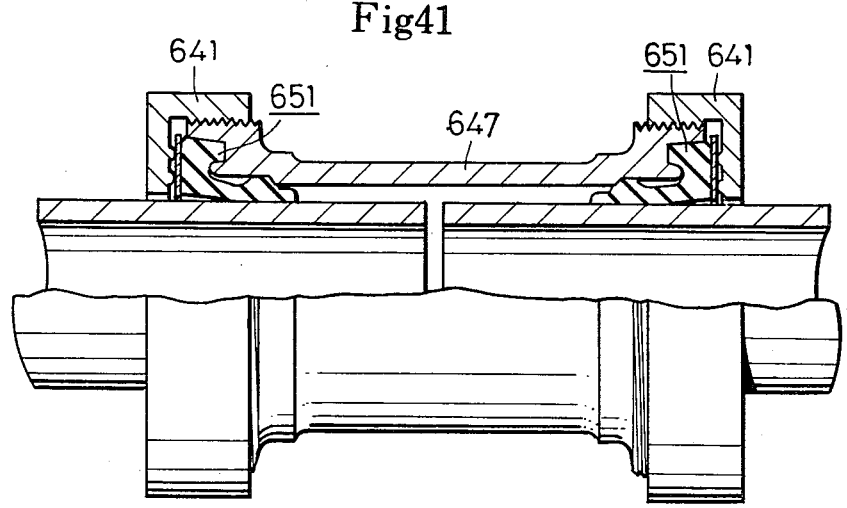

FIGS. 39 through 41 illustrate arrangements employing cap or box nut type packing glands associated with type B(b) packing members.

Each of the arrangements shown in FIGS. 39 through 41 employs a packing member or members 651 of the identical construction to that shown in FIG. 32b. Referring to FIG. 39, the arrangement employs a single packing member 651 which is held against one end of a pipe joint 645 by a cap nut type packing gland 641 threaded over the one end of the pipe joint 645. The arrangement further includes another pipe joint (unnumbered having a different structure from the pipe joint 645 and an interconnecting pipe connecting the two pipe joints in a mutually longitudinally spaced relation to connect a pair of pipeline sections. One of the pipeline sections is adjustably supported by the packing 651 and the other pipeline section is threadedly secured to the other pipe joint.

The arrangement of FIG. 40 employs a somewhat different pipe joint 646 which receives at one end a packing member 651 held in position by a cap nut type packing gland 641. FIG. 40 also illustrates a different type interconnecting member having one end threadedly connected into the pipe joint 646. One pipeline section is adjustably supported by the packing 651 and another pipeline section is securely fitted in the other end of the interconnecting member. FIG. 41 illustrates a further different type pipe joint 647 having a pair of symmetrically formed ends, thus eliminating the use of any additional pipe joint or interconnecting member. One packing member 651 is held in position against one end of the pipe joint 647 by a cap nut type packing gland 641 to adjustably support one pipeline section. Another packing member 651 is held against the other end of the pipe joint 647 by another cap nut type packing gland 641 to adjustably support another pipeline section. The arrangements shown in FIGS. 39 through 41 are all suitable for connecting a low pressure water supply line.

Referring to FIGS. 42a and 42b, there is shown another uniquely shaped packing member 90 which may be defined as a mixed structure of type B(a) and B(b) packing members. The packing 90 comprises an outer peripheral portion 91 having a generally semi-circular upper edge and a flat bottom edge as shown in FIG. 42b. The flat bottom edge includes an annular recess defining a highly flexible intermediate portion which is contiguous to a slightly inwardly inclined depending inner wall portion 92. The inner wall portion 92 terminates in an enlarged O-ring shaped clamping end 93 which serves to maintain the packing 90 in close contact with the outer periphery of a pipeline section 94 as illustrated in FIG. 42a. FIG. 42a also illustrates a substantially cylindrical pipe joint 95 having a radially outwardly extending end wall. The end wall of the pipe joint 95 includes an annular recess 96 extending along the inner periphery thereof. The flat bottom edge of the outer peripheral portion 91 closely fits the annular recess 96 and is held in position by a packing gland 97 encircling the pipeline section 94 and bolted to the end wall of the pipe joint 95. The pipe joint 95 includes a small annular projection 98 formed in the annular recess 96 and engaging the flat bottom edge of the outer peripheral portion 91 to prevent any undesirable radially inward displacement of the packing 90. The pipe joint 95 includes an increased inner diameter portion intermediate the ends thereof, which defines an enlarged free space 99 encircling the packing 90. The free space 99 allows fluid to flow into the clearance between the packing 90 and the pipe joint 95 and press the packing 90 more closely against the pipeline section 94 as fluid pressure increases. It will again be observed that an arrangement, such as shown in FIG. 42a, permits easy positioning of the packing without relying on any heavy deformation thereof. In order to establish the arrangement shown in FIG. 42a, the packing gland 97 and the packing 90 are inserted over the pipeline section 94, then the pipe joint 95 is applied against the packing 90 and finally the packing gland 97 is bolted to the pipe joint 95. The packing structure shown in FIGS. 42a and 42b is quite effective to prevent its intermediate portion from any undue deformation due to high fluid pressure. Because of its very simple structure, the packing 90 is readily useful for a variety of pipeline connecting purposes.

Figure 43A:
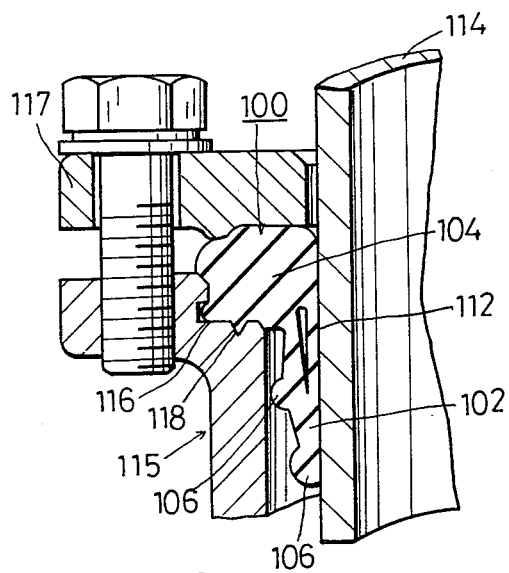
FIGS. 43a and 44a are views similar to FIG. 42a showing each a modified form of the packing shown therein.
Figure 43B:
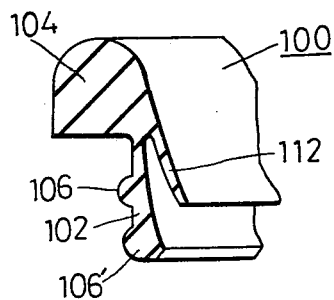
FIGS. 43b and 44b are views similar to FIG. 42b showing the packing members per se of FIGS. 43a and 44a, respectively.

FIG. 43a illustrates an arrangement which is substantially similar to that of FIG. 42a and employs a packing member 100 which is a modified form of the packing 90 employed in FIG. 42a. As shown in FIG. 43b, the packing 100 comprises an outer peripheral portion 104 having a generally semi-circular upper edge and a flat bottom edge and which is substantially identical in shape to the corresponding portion of the packing shown in FIG. 42b. The packing 100 includes a substantially cylindrical inner wall portion 102 depending from the flat bottom edge of the outer peripheral portion 104. The inner wall portion 102 is slightly inwardly inclined and terminates in a clamping end 106′ of enlarged thickness. An annular rib 106 is formed on the outer surface of the inner wall portion 102 intermediate the ends thereof.

The structure of FIG. 43b is featured by an innermost axial projection of the tapered cylindrical construction as indicated at 112. The innermost axial projection 112 also depends from the outer peripheral portion 104 and is smaller in length than the inner wall portion 102, terminating about halfway of the length of the inner wall portion 102. The innermost axial projection 112 extends generally in parallel to the inner wall portion 102, but is inwardly inclined at a greater angle than the inner wall portion 102. The innermost axial projection 112 is considerably smaller in thickness than the inner wall portion 102 which has a gradually decreasing thickness toward the outer peripheral portion 104. Thus, it will be noted that an intermediate portion at which the inner wall portion 102 and the innermost axial projection 112 join the outer peripheral portion 104 is flexible enough to provide a sufficient flexibility for the packing 100 as a whole.

Referring to FIG. 43a, the arrangement includes a pipe jonit 115 which is substantially cylindrical and has a radially extending enlarged end wall. The end wall of the pipe joint 115 is formed along its inner periphery with an annular recess 116 providing an annular shoulder for the packing 100. The annular shoulder 116 includes an annular groove 118 to retain the packing 100 in place relative to the pipe joint 115 when the packing 100 is positioned by a packing gland 117 bolted to the pipe joint 115. Formed along the outer periphery of the annular shoulder 116 is a further annular recess which is perpendicular to the annular groove 118. This unnumbered annular recess cooperates with the packing gland 117 in holding the packing 100 in position longitudinally with respect to the pipe joint 115. The packing 100 adjustably supports a pipeline section 114. The innermost axial projection 112 closely fits the outer surface of the pipeline section 114 and beyond the free end of the innermost axial projection 112, the inner wall portion 102 closely fits the outer surface of the pipeline section 114 and provides a continuous surface of sealing contact against the pipeline section 114. It will be understood that the structure shown in FIGS. 43a and 43b does not only provide a substantially doubled sealing effect, but also ensures safety against loss of sealing between the packing and the pipeline section. Any undue displacement or vibration of the pipeline section 114 may result in formation of a clearance between the inner wall portion 102 of the packing 100 and the pipeline section 114. Then, fluid flows through such a clearance, but it flows into the space between the inner wall portion 102 and the innermost axial projection 112. The fluid acts to press the innermost axial projection 112 more closely against the outer surface of the pipeline section 114 and no loss of effective sealing results from any such pipeline displacement or vibration.

Figure 44A:
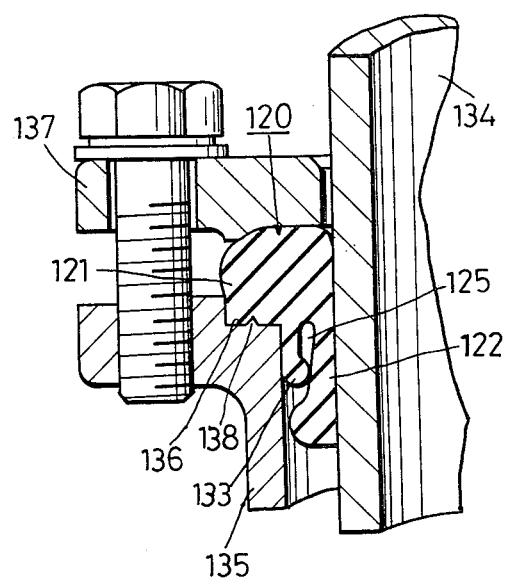
Figure 44B:
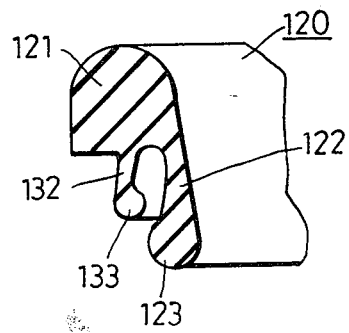

FIG. 44b shows a packing member 120 which is another modified form of the structure shown in FIG. 42b. The packing 120 comprises an outer peripheral portion 121 which is similar in shape to the portion 91 shown in FIG. 42b and has a generally flat bottom surface. An inner wall portion 122 depends from the inner edge of the outer peripheral portion 121 and terminates in a clamping end 123 of enlarged thickness which projects radially outwardly, all in the same manner as shown in FIG. 42b. The structure of FIG. 44b is characterized by a cylindrical wall projection 132 which depends from the flat bottom surface of the outer peripheral portion 121 and which is positioned outwardly of the inner wall portion 122. The wall projection 132 is considerably smaller in length than the inner wall portion 122 and terminates in a clamping end 133 of enlarged thickness which projects radially inwardly and which is located about halfway of the length of the inner wall portion 122. The inner wall portion 122 and the outer wall projection 132 extends in a generally parallel relation to each other, but it will be noted that while the inner wall portion 122 is slightly inwardly inclined, the outer wall projection 132 is directed in a slightly radially outward direction. Referring to FIG. 44a, there is shown a pipe joint 135 which is similar in construction to that described with reference to FIG. 42a. The packing member 120 is held in position against the pipe joint 135 by a packing gland 137 bolted thereto. The pipe joint 135 includes an annular shoulder 136 along the inner edge thereof and the flat bottom surface of the outer peripheral portion 121 of the packing 120 closely fits the annular shoulder 136. The annular shoulder 136 includes an annular projection 138 which retains the packing 120 in position and prevents any undesirable radial displacement thereof. In order to adjustably support a pipeline section 134 in an effectively fluid-tight manner, the inner wall portion 122 of the packing 120 closely fits the outer surface of the pipeline section 134 and the outer wall projection 132 closely fits the inner surface of the pipe joint 135. The inwardly directed clamping end 133 contacts the outer surface of the inner wall portion 122 to define an annular inner space 125 between the inner wall portion 122 and the outer wall projection 132. The contact between the inner wall portion 122 and the clamping end 133 of the outer wall projection 132 strengthens the sealing effect of the packing 120 between the pipeline section 134 and the pipe joint 135. The outwardly directed clamping end 123 is somewhat spaced from the inner surface of the pipe joint 135. The inner space 125 is usually closed and prevents fluid from reaching the outer peripheral portion 121 therethrough. As fluid pressure increases, fluid may flow into the inner space 125. The fluid flowing into the inner space 125 acts to expand the inner space 125, so that the inner wall portion 122 and the outer wall projection 132 are pressed more closely against the pipeline section 134 and the pipe joint 135, respectively, to maintain a constantly effective sealing effect. The structure shown in FIG. 44b may be modified to produce a variety of forms of type C packing according to a further aspect of this invention, which will be hereinafter described with reference to FIGS. 45a through 49b, in which packing members are employed without using any packing glands.

Figure 45A:
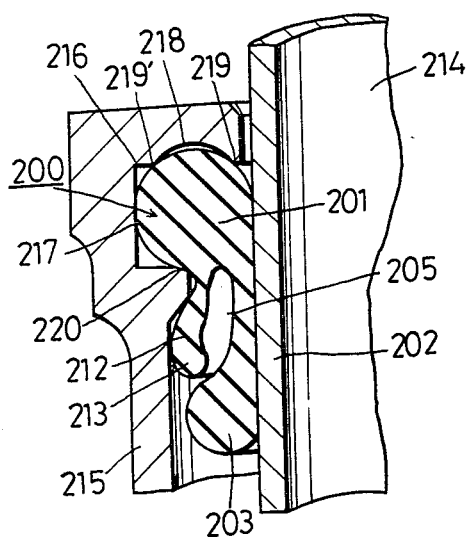
Figure 45B:
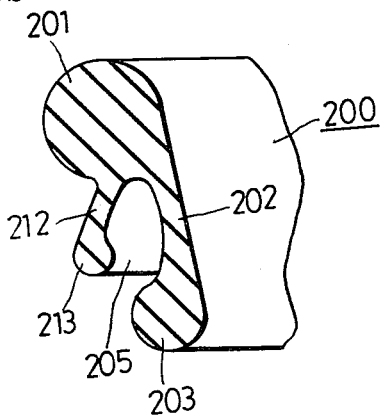

Attention is now directed to FIGS. 45a and 45b showing one form of type C packing according to this invention. There is shown a packing member 200 of the generally bifurcated construction having a generally cylindrical inner wall portion 202 and a generally cylindrical outer wall portion 212 which axially extend substantially in the same direction from an O-ring shaped end portion 201. As shown in FIG. 45b, the inner wall portion 202 is slightly inwardly directed and terminates in an outwardly directed ring-shaped projection 203. The outer wall portion 212 is somewhat outwardly directed and terminates in an inwardly directed ring-shaped projection 213. The outer wall portion 212 is somewhat smaller in length than the inner wall portion 202. The inner and outer wall portions 202 and 212 define an annular free space 205 therebetween. Referring to FIG. 45a, the packing 200 is held in position within a pipe joint 215 to support a pipe 214 in a fluidtight condition. The pipe joint 215 includes an inwardly facing annular groove 216 in which the O-ring shaped end portion 201 of the packing 200 is closely engaged. The pipe joint 215 further includes along the outer periphery of the groove 216 a coaxial annular flat surface 217 contacting the outer peripheral edge of the O-ring shaped end portion 201. The annular groove 216 includes an annular recess 218 having an arcuate cross section which is generally complementary to the outer peripheral surface of the O-ring shaped portion 201. The inner edge 220 supports thereon the O-ring shaped end portion 201 on the opposite side of the packing from the annular recess 218. The O-ring shaped end portion 201 of the packing 200 contacts the inner and outer edges 219 and 219' of the downwardly facing annular recess 218, as well as the surface 217 and the inner edge 220 in a fluid-tight manner. The circular cross section of the O-ring shaped end portion 201 ensures smooth insertion thereof into the annular recess 216 of the pipe joint 215 having a generally rectangular cross section and facilitates positioning of the packing 200 in place within the pipe joint 215. In order to establish the pipeline connection shown in FIG. 45a, the packing 200 is first inserted into the pipe joint 215 and the pipe 214 is then inserted through the packing 200. The inner wall portion 202 closely contacts the outer surface of the pipe 214 because of its excellent flexibility and elasticity to produce effective sealing between the packing 200 and the pipe 214, while satisfactorily permitting longitudinal and angular displacement of the pipe 214 relative to the pipe joint 215. The outer wall portion 212 effectively contacts the inner surface of the pipe joint 215 to provide satisfactory sealing between the packing 200 and the pipe joint 215. The inner wall portion 202 is spaced from the inner surface of the pipe joint 215 and the annular free space 205 is open between the inner and outer wall portions 202 and 212. The fluid flowing into the free space 205 acts on both the inner and outer wall portions 202 and 212 and strengthens their sealing contact with the pipe 214 and the pipe joint 215, respectively. Although it is somewhat more complicated in construction than type B(a) packing, a type C packing member can maintain itself in position for a long time without being appreciably influenced by any displacement of the associated pipeline section and thus provide a very effective sealing effect as a combined consequence of its excellent elasticity and flexibility and the action of fluid flowing into its inner free space as indicated at 205 in FIG. 45a. The ring-shaped projections in which the inner and outer wall portions, respectively, terminate provide a sufficient amount of resistance to deformation for maintaining the satisfactory sealing effect of the packing against the associated pipeline section and pipe joint, respectively. Both the inner and outer wall portions of the packing have a reduced thickness between their ring-shaped projections and the O-ring shaped end portion. This reduced wall thickness provides sufficient flexibility to obtain an effective sealing contact between the inner wall portion and the pipeline section and between the outer wall portion and the pipe joint.

Figure 46A:
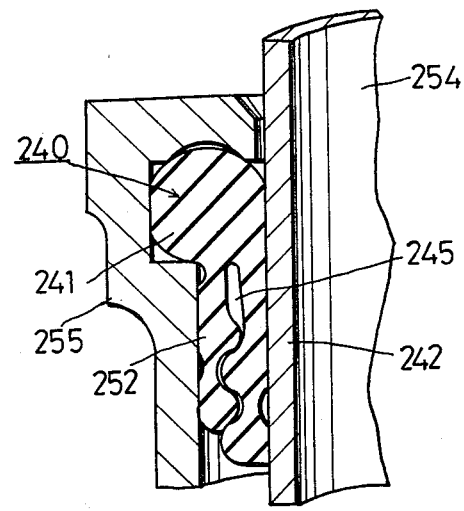
Figure 46B:
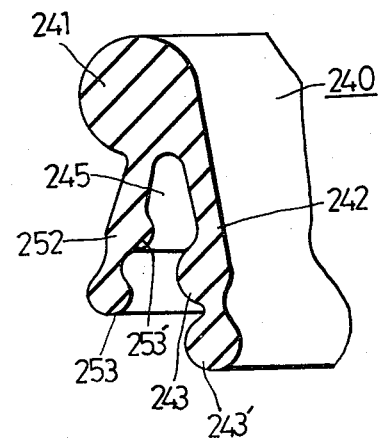

Referring to FIGS. 46a, and 46b, there is shown a modified type C packing member 240 associated with a pipe joint 255 to adjustably support a pipeline section 254. The pipe joint 255 is quite similar in construction to the pipe joint 215 shown in FIG. 45a and the packing 240 is positioned within the pipe joint 255 in a fashion similar to the mode shown in FIG. 45a. The packing 240 comprises a slightly inwardly directed inner wall portion 242, a slightly outwardly directed outer wall portion 252 which is somewhat smaller in length than the inner wall portion 242 and extends in a substantially parallel relation thereto, and an O-ring shaped end portion 241 from which both the inner and outer wall portions 242 and 252 depend. The inner wall portion 242 is enlarged in thickness intermediate the ends thereof to define along its outer peripheral surface an annular rib 243 having a semi-circular cross section, and terminates in a ring-shaped clamping end 243' of enlarged thickness having a circular cross section which is located adjacent to the annular rib 243, so that an annular recess having a generally semi-circular cross section is defined therebetween. The outer wall portion 252 is likewise enlarged in thickness intermediate the ends thereof to define an annular rib 253' having a semi-circular cross section on its inner peripheral surface. The outer wall portion 252 terminates in a ring-shaped clamping end 253 of enlarged thickness having a circular cross section which is located adjacent to the annular rib 253', whereby an annular recess having a semi-circular cross section is defined therebetween. The annular ribs 243 and 253' and the ring-shaped clamping ends 243' and 253 are located in a mutually staggered relation and as shown in FIG. 46a, the annular rib 243 of the inner wall portion 242 substantially fits the annular recess in the outer wall portion 252 when the pipeline section 254 is inserted through the packing 240. Likewise, the clamping end 253 of the outer wall portion 252 substantially fits the annular recess between the annular rib 243 and the clamping end 243' of the inner wall portion 242. The engagement thus obtained develops an oppositely acting force between the inner and outer wall portions 242 and 252 and ensures their close contact with the pipeline section 254 and the pipe joint 255, respectively, to maintain effective sealing therebetween. The inner and outer wall portions 242 and 252 define a closed annular space 245 as shown in FIG. 46a. The air present in the annular space 245 assists the elasticity of the inner and outer wall portions 242 and 252 in enhancing and maintaining the effective sealing function of the packing 240. The packing 240 shown in FIG. 46a may be effectively used for high pressure pipeline connection, since the staggered engagement between the inner and outer wall portions 242 and 252 restricts high pressure fluid reaching the O-ring shaped end portion 241.

Figure 47A:
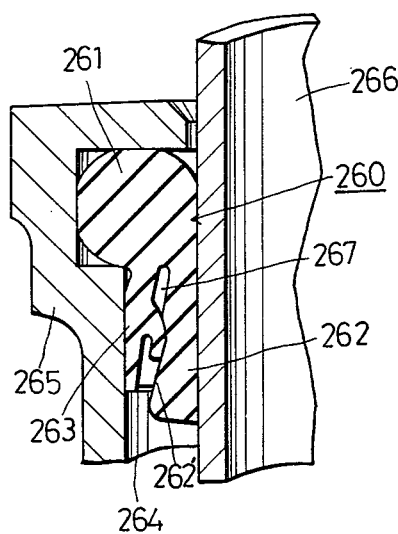
Figure 47B:
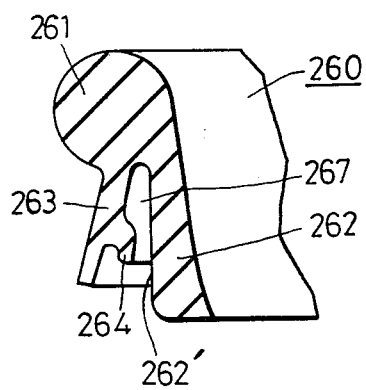

FIGS. 47a and 47b illustrate a further modified packing member 260 associated with a pipe joint 265 to adjustably support a pipeline section 266. The pipe joint 265 is quite similar in construction to that shown in FIG. 46a, with the difference that it has no such annular recess in the inner surface of its end wall as shown in FIG. 46a. The packing 260 comprises a slightly inwardly directed inner wall portion 262 contacting the outer surface of the pipeline section 266, a slightly outwardly directed outer wall portion 263 contacting the inner surface of the pipe joint 265, and an O-ring shaped end portion 261 from which both the inner and outer wall portions 262 and 263 depend in a substantially mutually parallel relation. The inner wall portion 262 has an even outer surface 262' and is gradually enlarged in thickness toward its free end. The outer wall portion 263 includes an inwardly and downwardly curved annular projection 264 formed intermediate the ends thereof and extending in a substantially parallel relation to the inner wall portion 262. The outer wall portion 263 is somewhat smaller in length than the inner wall portion 262 and the annular projection 264 terminates inwardly of the free end of the outer wall portion 263. When the pipeline section 266 is inserted through the packing 260, the annular projection 264 closely contacts the outer surface 262' of the inner wall portion 262 and defines a closed annular space 267 between the inner and outer wall portions 262 and 263 as shown in FIG. 47a. The annular projection 264 is encircled by an open annular space and any fluid flowing into this open annular space presses the annular projection 264 against the inner wall portion 262 to thereby effectively strengthen the sealing contact of the inner wall portion 262 with the pipeline section 266. Such fluid also presses the outer wall portion 263 against the inner surface of the pipe joint 265 with a stronger force to further improve the sealing contact between the packing 260 and the pipe joint 265. With the structure shown in FIGS. 47a and 47b, it will be understood that a satisfactory flexibility can be maintained for the packing 260 as a whole by maintaining an optimum resiliency for the annular projection 264, which also allows for an increase in the area of contact between the annular projection 264 and the inner wall portion 262, whereby the closure of the annular space 267 can be maintained as required to suit the nature and pressure of the fluid involved. Accordingly, the shape and position of the annular projection 264 are not restricted to those shown in FIG. 47b, but may be modified in a variety of fashions by anybody of ordinary skill in the art. For instance, it can be provided on the outer surface of the inner wall portion 262 to contact the inner surface of the outer wall portion 263.

Figure 48A:
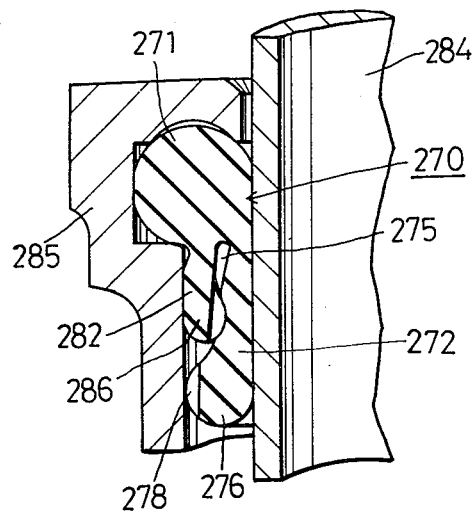
Figure 48B:
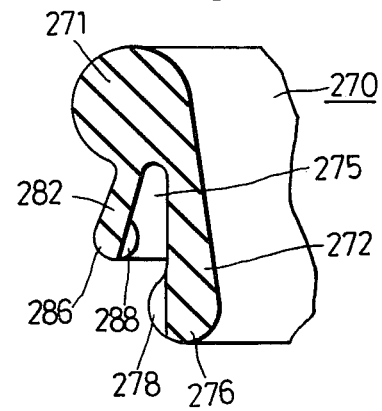

Referring to FIGS. 48a and 48b, there is shown a packing member 270 which is a slightly modified form of the packing 200 described with reference to FIGS. 45a and 45b and which is associated with a pipe joint 285 to adjustably support a pipeline section 284. The pipe joint 285 is generally similar in construction to the structure shown in FIG. 45a with the difference, however, that the radial distance between the outer surface of the pipeline section 284 and the inner surface of the pipe joint 285 in the arrangement of FIG. 48a is generally smaller than in the case of FIG. 45a. The packing 270 comprises a slightly inwwardly directed inner wall portion 272, a slightly outwardly directed outer wall portion 282 having a smaller length than the inner wall portion 272 and an O-ring shaped end portion 271 from which the inner and outer wall portions 272 and 282 depend in a substantially parallel relation to each other. The inner wall portion 272 terminates in a ring-shaped clamping end 276 of enlarged thickness in the outer surface thereof to define a radially outwardly directed annular projection having a semi-circular cross section. The outer wall portion 282 terminates, about halfway of the length of the inner wall portion 272, in a ring-shaped clamping end 286 of enlarged thickness in the inner surface thereof to define a radially inwardly directed annular projection having a semi-circular cross section. The annular projections of the clamping ends 276 and 286 of the inner and outer wall portions 272 and 282, respectively, are each formed with a plurality of recesses 278 and 288 spaced apart from one another along the outer circumference thereof. Because of the relatively narrow clearance between the outer surface of the pipeline section 284 and the inner surface of the pipe joint 285, the inner wall portion 272 closely contacts the pipeline section 284 and the annular projection of its clamping end 276 contacts the inner surface of the pipe joint 285. Likewise, the outer wall portion 282 closely contacts the inner surface of the pipe joint 285 and the annular projection of its clamping end 286 contacts the outer surface of the inner wall portion 272 to define a generally closed annular space 275 between the inner and outer wall portions 272 and 282 as shown in FIG. 48a. Thus, the inner and outer wall portions 272 and 282 push each other to maintain effective sealing between the pipeline section 284 and the pipe joint 285. Due to the presence of the recesses 278 and 288, fluid flows into the annular space 275 and ensures maintenance of effective sealing.

Figure 49A:
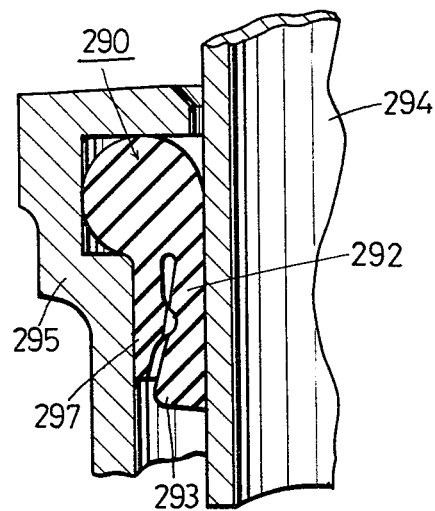
Figure 49B:
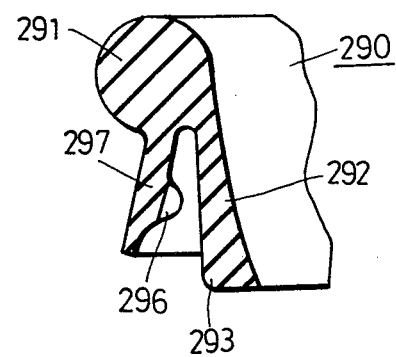

Referring finally to FIGS. 49a and 49b, there is shown a packing member 290 which is a modified form of the packing 260 shown in FIGS. 47a and 47b. In order to adjustably support a pipeline section 294, the packing 290 is associated with a pipe joint 295 which is substantially identical to the structure illustrated in FIG. 47a. The packing 290 comprises a slightly inwardly directed inner wall portion 292, a slightly outwardly directed outer wall portion 297 having a smaller length than the inner wall portion 292 and an O-ring shaped end portion 291 from which the inner and outer wall portions 292 and 297 depend in a generally parallel relation to each other. The inner wall portion 292 has a flat outer surface and is gradually increased in thickness toward its free end. The outer wall portion 297 is provided on the inner surface thereof with an annular projection 296 having a semi-circular cross section. The annular projection 296 is formed with a plurality of recesses spaced apart from one another. The annular projection 296 is provided intermediate the ends of the outer wall portion 297 which has a decreasing thickness toward its free end. As shown in FIG. 49a, the annular projection 296 contacts the outer surface of the inner wall portion 292 to define a generally closed annular space between the inner and outer wall portions 292 and 297 and the inner wall portion 292 is spaced from the inner surface of the pipe joint 295. As compared with the structure shown in FIGS. 48a and 48b, the packing 290 shown in FIGS. 49a and 49b is advantageous in that because of their free end shapes having no rounded edges, the inner and outer wall portions 292 and 297 contact the outer surface of the pipeline section 294 and the inner surface of the pipe joint 295, respectively, along their entire lengths to thereby prevent any fluid leakage around the packing 290 that might result from the rounded edges of the inner and outer wall portions of the packing illustrated in FIGS. 48a and 48b.

It will be noted from the foregoing description that the packing of this invention essentially comprises a substantially cylindrical or annular outer peripheral portion adapted to closely contact the inner surface of a pipe joint adjacent to one end thereof, a substantially cylindrical inner peripheral portion elastically deformable to closely contact the outer surface of a pipeline section which extends into the pipe joint and is radially spaced from the pipe joint to be supported adjustably relative to the pipe joint and another pipeline section, and a generally annular intermediate portion extending from the inner circumferential edge of the outer peripheral portion and inwardly directed to flexibly connect the inner and outer peripheral portions. The packing is made of suitably flexible and elastic material in a unitary construction. It will also be noted that the packing of this invention may most effectively be employed in conjunction with a uniquely shaped pipe joint adapted to define a free space encircling a pipeline section to support it positionally adjustably relative to another pipeline section.

It will further be observed that of considerable importance to the packing of this invention is an annular rib or projection provided on the majority of the structures as hereinabove described. As described, this annular rib or projection may be formed on either the outer surface of the inner peripheral portion or the inner surface of the outer peripheral portion or both, and may be provided with a plurality of recesses, which may in some instances divide the annular rib into a plurality of arcuate rib sections. The annular rib or rib sections may be integral with the inner or outer peripheral portion, or may alternatively be a separate part or parts attached by bonding or otherwise. The annular rib or projection has been described in a variety of fashions, but is not limited thereto, and may be further modified in various ways, if it is capable of performing the following principal functions:

(a) Totally or substantially closing the annular space between the inner and outer peripheral portions;

(b) Reinforcing the sealing effect of the packing by virtue of the oppositely acting forces developed by the rib between the inner and outer peripheral portions; and (c) Providing a reinforced support for a pipeline section extending into the packing. It is, however, to be understood that some forms of the annular rib may provide all of these functions, while others may not, depending on its particular structure and the type of the packing involved.

With particular reference to the function (a) mentioned above, it will further be noted that:

(i) If the annular rib has no recess, it keeps the annular space between the inner and outer peripheral portions totally closed if fluid in a pipeline is at a relatively low pressure. The air present in this annular space urges the inner and outer peripheral portions in radially opposite directions when fluid flows against the annular rib to thereby help strengthen the sealing contacts of the packing with the associated pipeline and pipe joint surfaces.

(ii) If fluid pressure is relatively high, or if the pipeline is caused to vibrate, fluid gradually flows into the annular space between the inner and outer peripheral portions to urge them into a stronger contact with the associated surfaces, even if the annular rib does not have any recess. Even in such a situation, the presence of the rib and the air present in the annular space prevent any unduly high fluid pressure from acting on the intermediate portion of the packing and causing any undesirable displacement of the packing that might result in the loss of an effective seal. As fluid pressure decreases, fluid gradually flows out of the annular space and lowers its urging effect against the inner and outer peripheral portions, but this does not present any obstruction to maintenance of effective sealing. The packing maintains its own sealing effect which is more than sufficient for the reduced fluid pressure.

(iii) If the annular rib is provided with a plurality of recesses, fluid flows into the annular space between the inner and outer peripheral portions and helps maintain the satisfactory sealing effect of the packing to an extent variable from time to time in accordance with variation in fluid pressure. The annular rib or projection must, however, be capable of preventing any unduly high fluid pressure from working on the intermediate portion as mentioned above, as well as of providing its functions (a) and (b) satisfactorily. In this connection, it is important that the type of any recess in the annular rib should be appropriately selected to suit a particular packing employed under particular conditions. Particularly, the opening defined by each recess must not be too large.

It will be easily observed that a portion of the fluid flowing from one pipeline section to another through the associated pipe joint does not only assist the sealing effect of the packing as described above by flowing into the annular space between the inner and outer peripheral portions, but also do so by urging the free end portions of the packing into closer contact with the associated surfaces before flowing into the annular space. It will also be noted that the annular rib or projection need not be provided with any such recesses, if the associated pipe joint is so constructed as to provide such recesses.

Although the invention has been described with reference to a number of embodiments and their respective modifications, it is to be understood that further variations or modifications may be easily made by those skilled in the art without departing from the scope of the invention defined by the appended claims.

What is claimed is:

1. A packing member of flexible elastic material, a pipe joint member, said pipe joint member having means defining an inner peripheral configuration which includes portions generally transverse to the longitudinal axis thereof to seal a joint in a pipeline, and a pipeline having an axis and a non-grooved outer cylindrical surface, said packing member when assembled with said pipe joint member and said pipeline comprising:

inner peripheral means for sealingly engaging a portion of said pipeline by virtue of its elasticity and having a plain cylindrical inner surface;

outer peripheral means for sealingly engaging said pipe joint member, said means being relatively thick and having a configuration of shape and size complementary to that of said pipe joint member whereby to be securely held thereby against axial movement relative thereto, said outer peripheral means being spaced from said inner peripheral means; and a generally annular intermediate portion connecting said inner and outer peripheral sealing means integrally with each other, said intermediate portion being relatively small in thickness as compared with said outer peripheral sealing means and being generally inclined relative to the axis of the pipeline from said outer peripheral sealing means to said inner peripheral sealing means to define an outwardly diverging annular clearance between said packing member and said portion of said pipeline, said pipe joint member defining an annular clearance which encircles said portion of said pipeline and which communicates with said outwardly divirging clearance, said intermediate portion being flexible and being tapered in thickness from the said outer means to the said inner means by being thinner at the said inner means than at the said outer means, whereby relative axial movement between said pipeline and pipe joint member will result in flexing and/or stretching of said intermediate portion prior to disturbance of the engagement to said outer peripheral means with said pipe joint member.

2. The invention as defined in claim 1 wherein said inner peripheral portion is enlarged in thickness toward its free end.

3. The combination of claim 1, wherein said intermediate portion is funnel shaped.

4. The structure of claim 1, wherein said outer peripheral means comprises at least one surface generally transverse to the pipeline longitudinal axis.

5. The structure of claim 4, said outer peripheral means having two spaced apart and oppositely facing transverse surfaces engageable by said pipe joint member.

6. The structure of claim 5, said inner peripheral means being of increasing thickness from said intermediate portion.

7. The structure of claim 6, and rib means extending from one said peripheral means toward the other said peripheral means and engageable therewith when said pipeline is inserted into said packing member.

8. The structure of claim 7, said rib being annular and having recesses in the periphery thereof.

9. The structure of claim 1, and rib means extending from one said peripheral means toward the other said peripheral means and engageable therewith when said pipeline is inserted into said packing member.

10. The structure of claim 1, said rib being annular and having recesses in the periphery thereof.

11. The structure of claim 1, said intermediate portion being concave towards said clearance and pipeline, whereby upon axial displacement of said pipeline relative to said pipe joint member, the concavity of said intermediate portion will be changed.

12. The structure of claim 11, wherein there is a line of demarcation between the inner surface of said intermediate portion and the inner surface of said inner peripheral means, whereby to enhance the movement of said intermediate portion relative to said inner peripheral means.

13. The structure of claim 11, wherein said outer peripheral means comprises at least one surface generally transverse to the pipeline longitudinal axis.

14. The structure of claim 13, and rib means extending from one said peripheral means toward the other said peripheral means and engageable therewith when said pipeline is inserted into said packing member.

15. The structure of claim 1, wherein said outer peripheral means is of O-ring shape.

16. The structure of claim 15, said inner peripheral means having an outwardly projecting annular rib extending therefrom engageable with said pipe joint member upon insertion of a pipeline into said packing member.

17. The structure of claim 16, said rib being on the end of said inner peripheral member remote from said intermediate portion.

18. The structure of claim 16, said rib being on said inner peripheral member intermediate said intermediate portion and end of said peripheral member remote from said intermediate portion.

19. The structure of claim 1, wherein said outer peripheral means is a radially extending flange having at least one flat surface generally transverse to the pipeline axis for engagement by a corresponding surface of the pipe joint member.

20. The structure of claim 19, said inner peripheral means having an outwardly projecting annular rib extending therefrom and engageable with said pipe joint member upon insertion of a pipeline into said packing member.

21. The structure of claim 20, said rib having recesses in the periphery thereof.

22. The structure of claim 19, said rib means extending from one said peripheral means toward the other said peripheral means and engageable therewith when said pipeline is inserted into said packing member.

23. The structure of claim 22, said intermediate portion being concave towards said clearance and pipeline whereby upon axial displacement of said pipeline relative to said pipe joint member, the concavity of said intermediate portion will be changed.

24. The structure of claim 19, wherein said outer peripheral means has a pair of generally parallel substantially flat surfaces generally transverse to the pipeline axis for engagement by corresponding surfaces of the pipe joint member.

25. The structure of claim 19, wherein said flange has a second surface which is generally semi-circular in axial cross section in the uncompressed state thereof.

26. The structure of claim 25, wherein said flat surface is in adjacent angular relationship to said intermediate portion, and an annular recess at the junction of said flat surface and said intermediate portion.

27. The structure of claim 26, said inner peripheral means comprising an enlarged end opposite said intermediate portion, extending radially outwardly therefrom, whereby to provide a clamping force on a pipeline inserted thereinto.

28. In combination, a pipeline characterized by a generally cylindrical and non-grooved outer surface, a pipe joint member in spaced encircling relationship thereto and having spaced apart surfaces extending generally transversely of the pipeline axis, and a flexible and elastic packing member, said packing member having:
(i) outer annular means having a size and shape for cooperatively sealingly engaging said surfaces of said pipe joint member, and for being held thereby against axial displacement,
(ii) inner annular means having a plain cylindrical inner surface for elastically sealingly engaging the cylindrical surface of said pipe line, and
(iii) an intermediate portion integrally connecting said inner and outer annular means,
  (a) being of small thickness and greater flexibility than said outer annular means,
  (b) being of tapering thickness from said outer to said inner means,
  (c) being inclined from said outer to said inner means, and
  (d) being concave towards said pipeline,
whereby to provide a strong non-shiftable supporting engagement of said outer annular sealing means by said pipe joint member, an elastic sealing engagement of said pipeline and said inner annular means, and whereby said shifting relative to said pipe joint member is readily accommodated by said thin, tapered and concave construction of said intermediate portion.

* * * * *